US012006747B2

(12) United States Patent
Iijima et al.

(10) Patent No.: US 12,006,747 B2
(45) Date of Patent: Jun. 11, 2024

(54) SLIDING DOOR DEVICE

(71) Applicant: SUGATSUNE KOGYO CO., LTD., Tokyo (JP)

(72) Inventors: Tadashi Iijima, Tokyo (JP); Kazuma Mori, Tokyo (JP); Takuma Komoto, Tokyo (JP)

(73) Assignee: SUGATSUNE KOGYO CO., LTD., Tokyo (JP)

( * ) Notice: Subject to any disclaimer, the term of this patent is extended or adjusted under 35 U.S.C. 154(b) by 76 days.

(21) Appl. No.: 17/632,177

(22) PCT Filed: May 27, 2020

(86) PCT No.: PCT/JP2020/020896
§ 371 (c)(1),
(2) Date: Feb. 1, 2022

(87) PCT Pub. No.: WO2021/029120
PCT Pub. Date: Feb. 18, 2021

(65) Prior Publication Data
US 2022/0228411 A1 Jul. 21, 2022

(30) Foreign Application Priority Data
Aug. 9, 2019 (JP) ................................ 2019-147829

(51) Int. Cl.
*E05D 15/06* (2006.01)
*E05D 15/10* (2006.01)
*E05F 1/16* (2006.01)

(52) U.S. Cl.
CPC ................ *E05D 15/10* (2013.01); *E05F 1/16* (2013.01)

(58) Field of Classification Search
CPC ................ E05D 15/10; E05D 15/1042; E05D 2015/1055; E05Y 2201/64;
(Continued)

(56) References Cited

U.S. PATENT DOCUMENTS 4,644,690 A * 2/1987 Caimi ................ E05D 15/1042 49/128
5,271,181 A * 12/1993 Pietro .................. E05F 15/565 49/213
(Continued)

FOREIGN PATENT DOCUMENTS

DE 3831963 A1 3/1990
JP 2008-285942 A 11/2008
(Continued)

OTHER PUBLICATIONS

WIPO, Japanese International Search Authority, International Search Report (with English translation) dated Jul. 14, 2020 in International Patent Application No. PCT/JP2020/020896, 5 pages.
(Continued)

*Primary Examiner* — Jerry E Redman
(74) *Attorney, Agent, or Firm* — MASUVALLEY & PARTNERS; Peter Martinez

(57) ABSTRACT

Provided is a sliding door device which can move a support shaft attached to a sliding door along an inclined portion of a rail by using a pull-in device. The rail (6*a*) is provided with the straight portion (11) for linearly guiding the support shaft attached to the sliding door (2) and the inclined portion (12) which is inclined with respect to the straight portion (11) and obliquely guides the support shaft. The straight portion (11) of the rail (6*a*) is provided with the pull-in device (15) which can capture a trigger (18) provided on the straight portion (11) of the rail (6*a*) and linearly move along the straight portion (11) of the rail (6*a*) when the sliding door (2) is closed. A pull-in force transmission part (20) for moving the support shaft along the inclined portion (12) of the rail (6*a*) is coupled to the pull-in device (15).

5 Claims, 28 Drawing Sheets

(58) Field of Classification Search

CPC ......... E05Y 2201/686; E05Y 2201/684; E05Y 2600/12; E05Y 2800/205; E05Y 2800/24; E05Y 2900/132; E05F 5/003

USPC .................... 49/213, 221, 223, 225, 209, 211

See application file for complete search history.

(56) References Cited

U.S. PATENT DOCUMENTS

| | | | | |
|---|---|---|---|---|
| 5,483,769 | A * | 1/1996 | Zweili | E05F 15/638 49/118 |
| 6,336,246 | B1 * | 1/2002 | Giovannetti | E06B 3/4672 49/128 |
| 6,385,910 | B1 * | 5/2002 | Smink | E05D 15/08 49/213 |
| 7,426,803 | B2 * | 9/2008 | Fronz | B61D 19/008 49/213 |
| 7,437,852 | B2 * | 10/2008 | Dufour | E05F 11/535 49/213 |
| 7,549,251 | B2 * | 6/2009 | Jarolim | E05F 15/655 49/223 |
| 8,096,629 | B2 * | 1/2012 | Halfon | E05D 15/56 312/319.7 |
| 8,402,606 | B1 * | 3/2013 | Tsai | E05F 5/003 16/49 |
| 8,745,821 | B2 * | 6/2014 | Chang | E05F 1/16 16/49 |
| 8,793,839 | B2 | 8/2014 | Iwasaki | |
| 8,984,810 | B2 * | 3/2015 | Bortoluzzi | E05D 15/1042 49/213 |
| 9,388,622 | B1 | 7/2016 | Paron | |
| 9,435,152 | B2 * | 9/2016 | Zimmer | E05F 5/003 |
| 9,739,080 | B2 * | 8/2017 | Yoon | E05D 15/0608 |
| 9,879,459 | B2 * | 1/2018 | Zimmer | F16C 41/001 |
| 9,885,206 | B2 * | 2/2018 | Shin | E05F 3/00 |
| 10,087,667 | B2 * | 10/2018 | Girotto | E05D 15/1065 |
| 10,221,604 | B2 * | 3/2019 | Zimmer | E05F 1/16 |
| 10,328,955 | B2 * | 6/2019 | Yamaguchi | B61D 19/005 |
| 10,889,307 | B2 * | 1/2021 | Sakaki | B61D 19/003 |
| 11,408,218 | B2 * | 8/2022 | Lijima | E05D 15/0626 |
| 11,585,140 | B2 * | 2/2023 | Terno | E05F 1/16 |
| 2006/0225356 | A1 * | 10/2006 | Jarolim | E05D 11/00 49/218 |
| 2013/0219657 | A1 * | 8/2013 | Iwaki | E05F 3/04 16/64 |
| 2016/0333622 | A1 * | 11/2016 | Glogowski | E05F 3/18 |
| 2016/0369547 | A1 | 12/2016 | Sato | |
| 2020/0149333 | A1 * | 5/2020 | Stoepker | E05D 15/101 |
| 2020/0190882 | A1 * | 6/2020 | Bantle | E05F 3/00 |
| 2021/0381293 | A1 * | 12/2021 | Zimmer | E05F 1/16 |
| 2022/0228411 | A1 * | 7/2022 | Iijima | E05F 1/16 |

FOREIGN PATENT DOCUMENTS

| | | | |
|---|---|---|---|
| JP | 2012-107415 | A | 6/2012 |
| JP | 2015-519490 | A | 7/2015 |
| JP | 5952970 | B2 | 7/2016 |
| KR | 101661081 | B1 | 9/2016 |
| WO | WO-2020137001 | A1 * | 7/2020 |

OTHER PUBLICATIONS

WIPO, Japanese International Search Authority, International Written Opinion dated Jul. 17, 2020 in International Patent Application No. PCT/JP2020/020896, 4 pages.

SESR/EPO, Supplementary European Search Report dated Jul. 14, 2023 in European Patent Application No. 20852514.7, 7 pages with translation.

* cited by examiner

[Fig. 1]
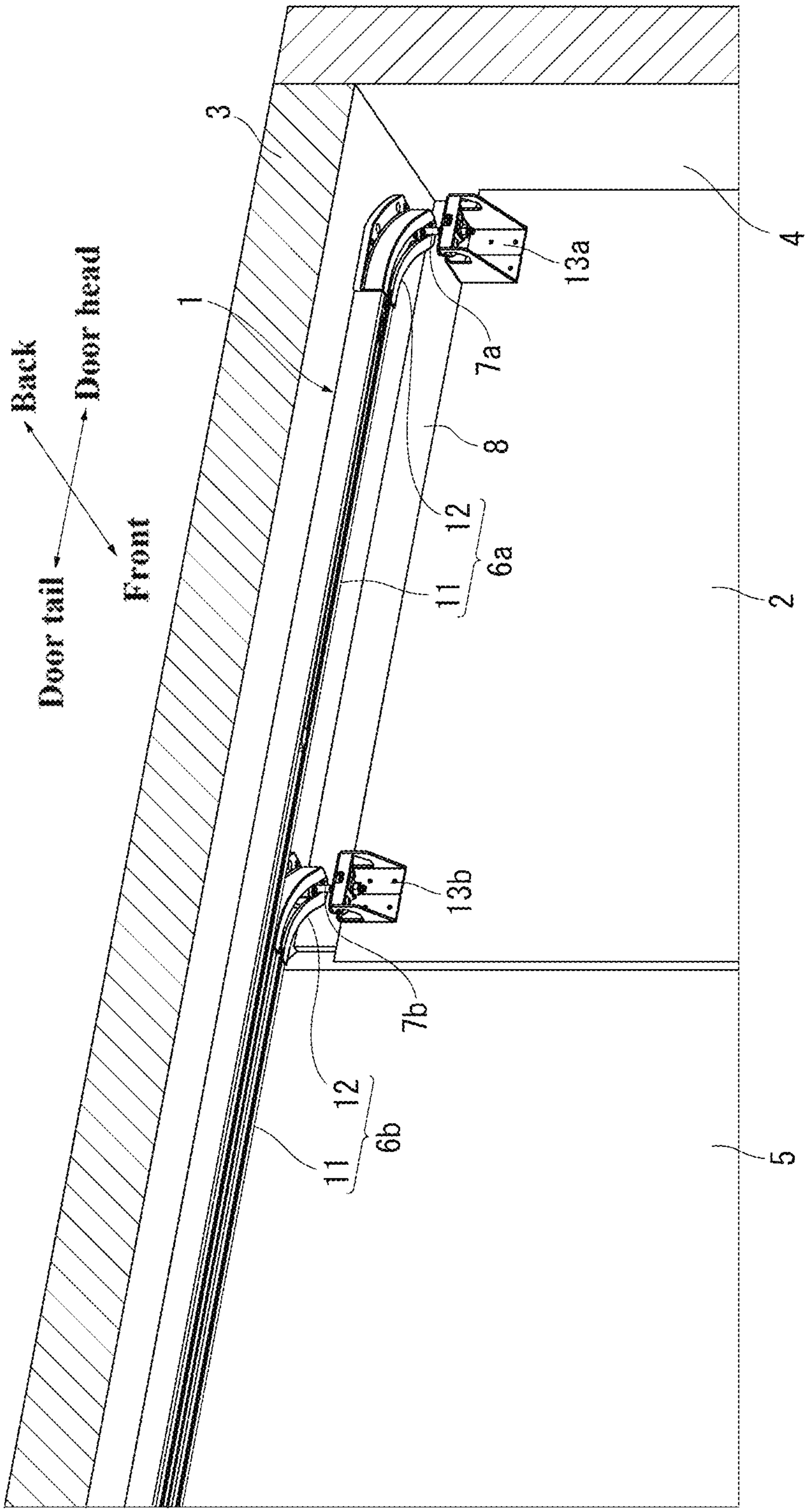

[Fig. 2]
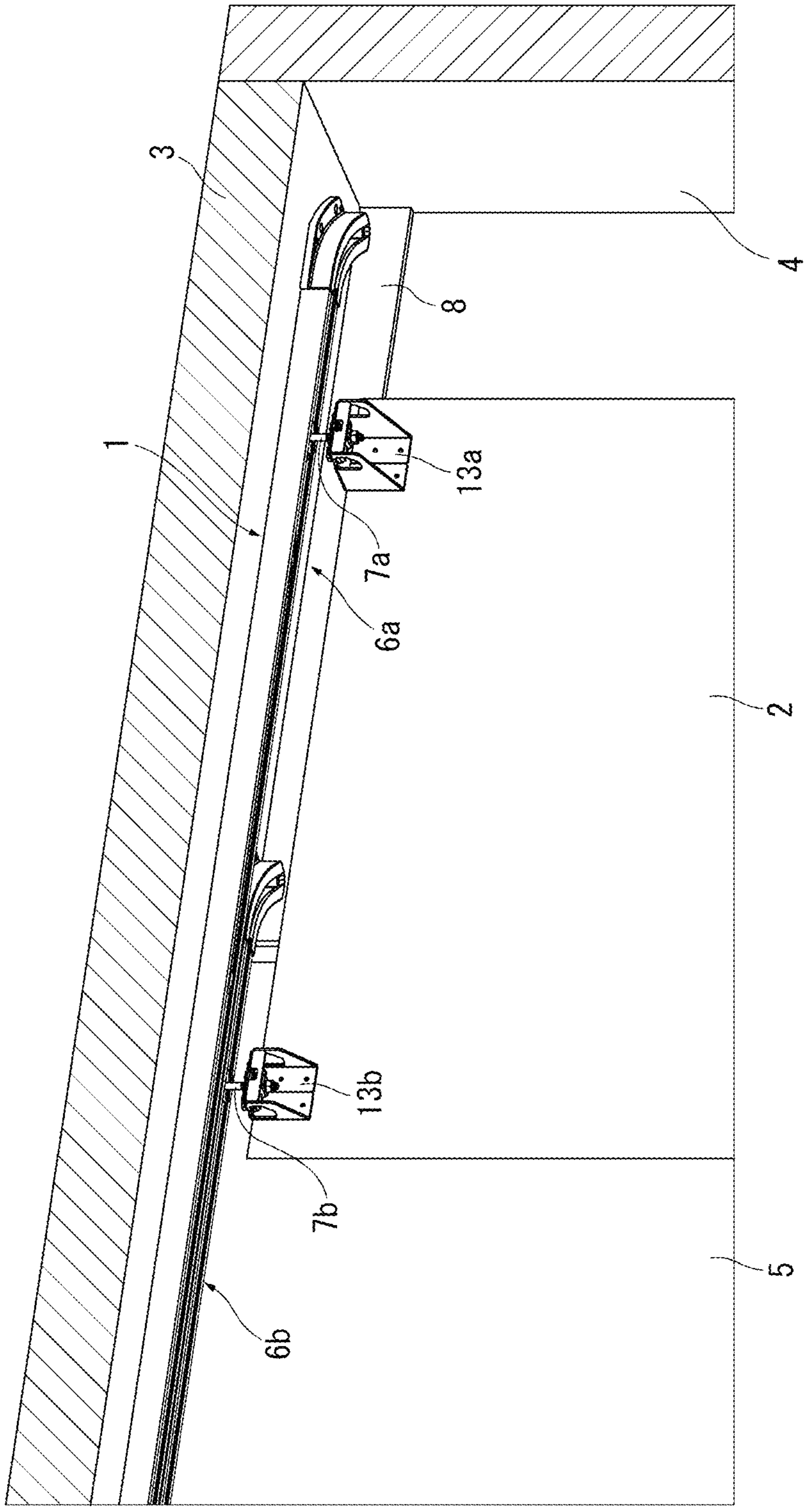

[Fig. 3]
(a)
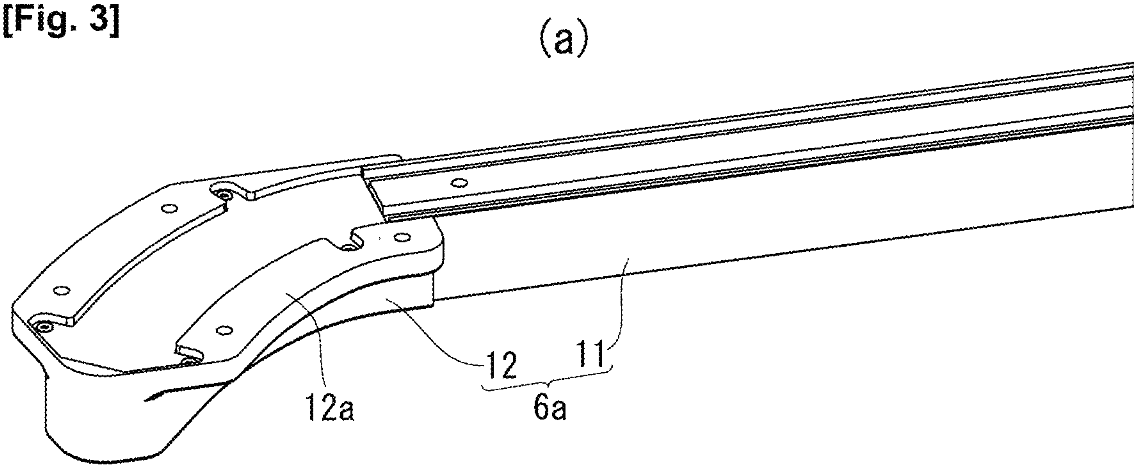
(b-1)
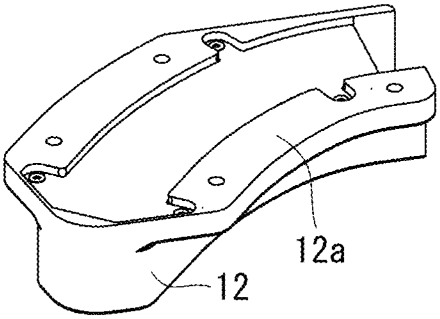
(b-2)
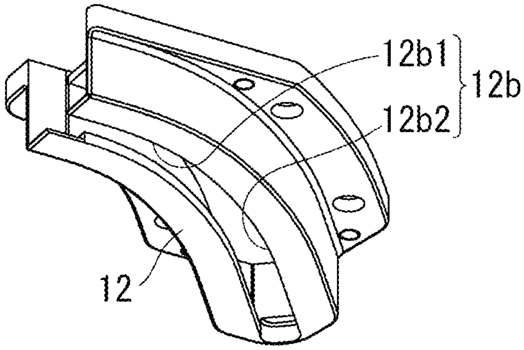
(c)
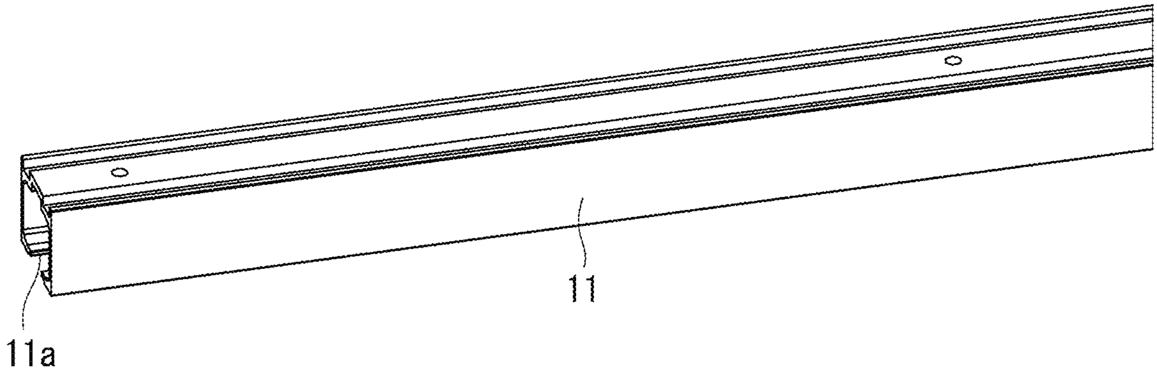

[Fig. 4]
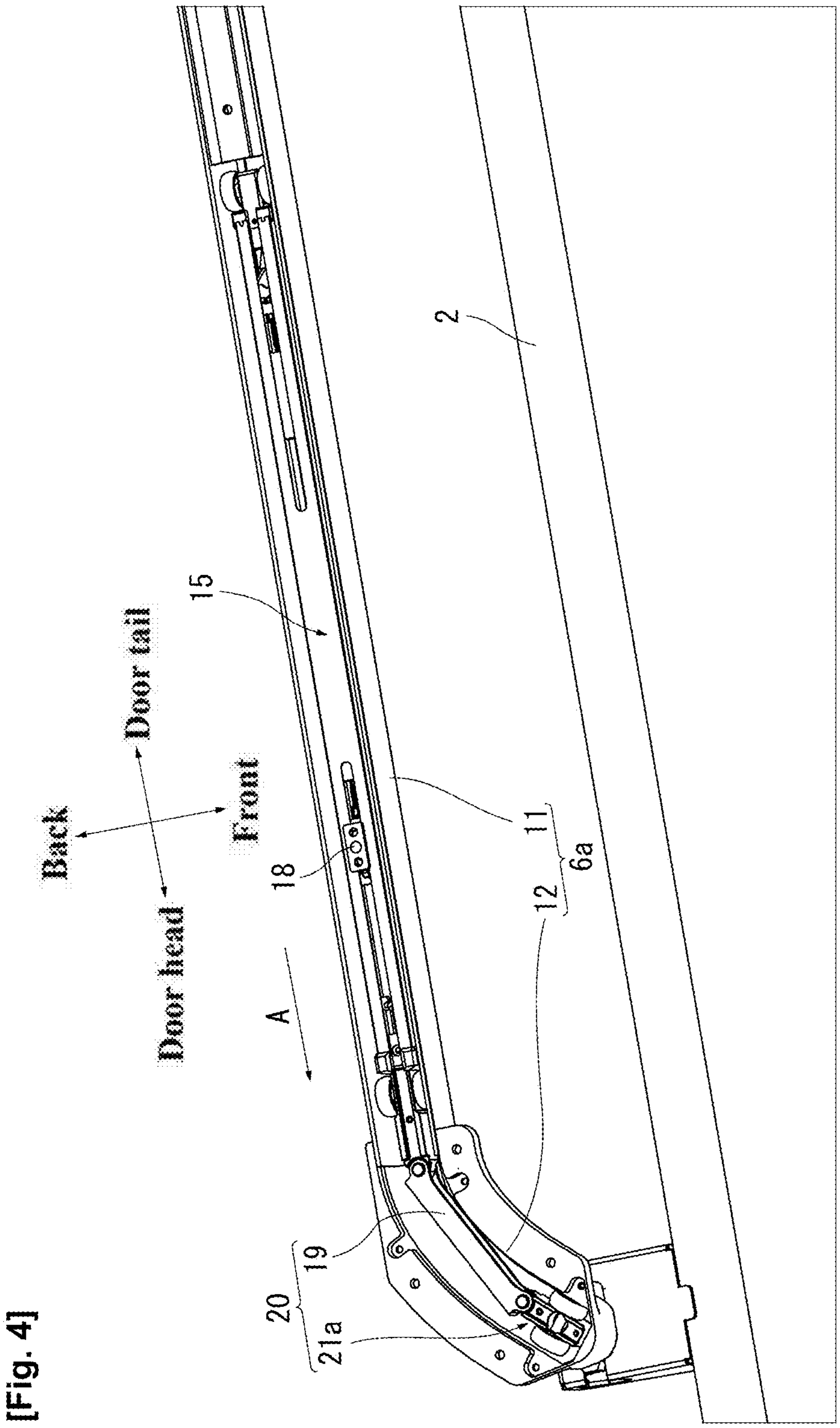

[Fig. 5]
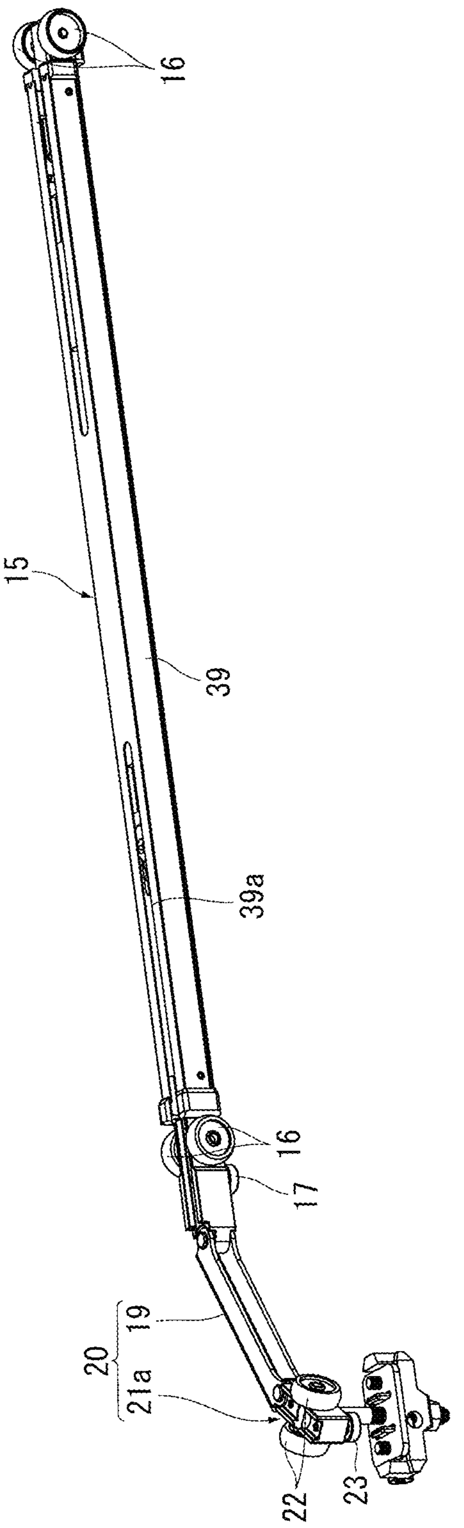

[Fig. 6]
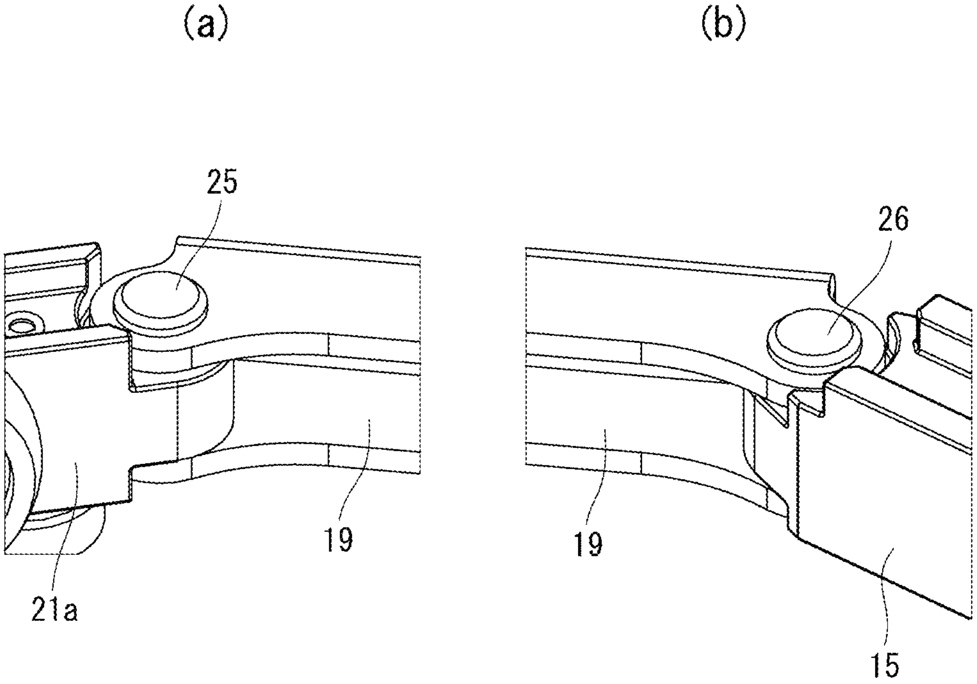

[Fig. 7]
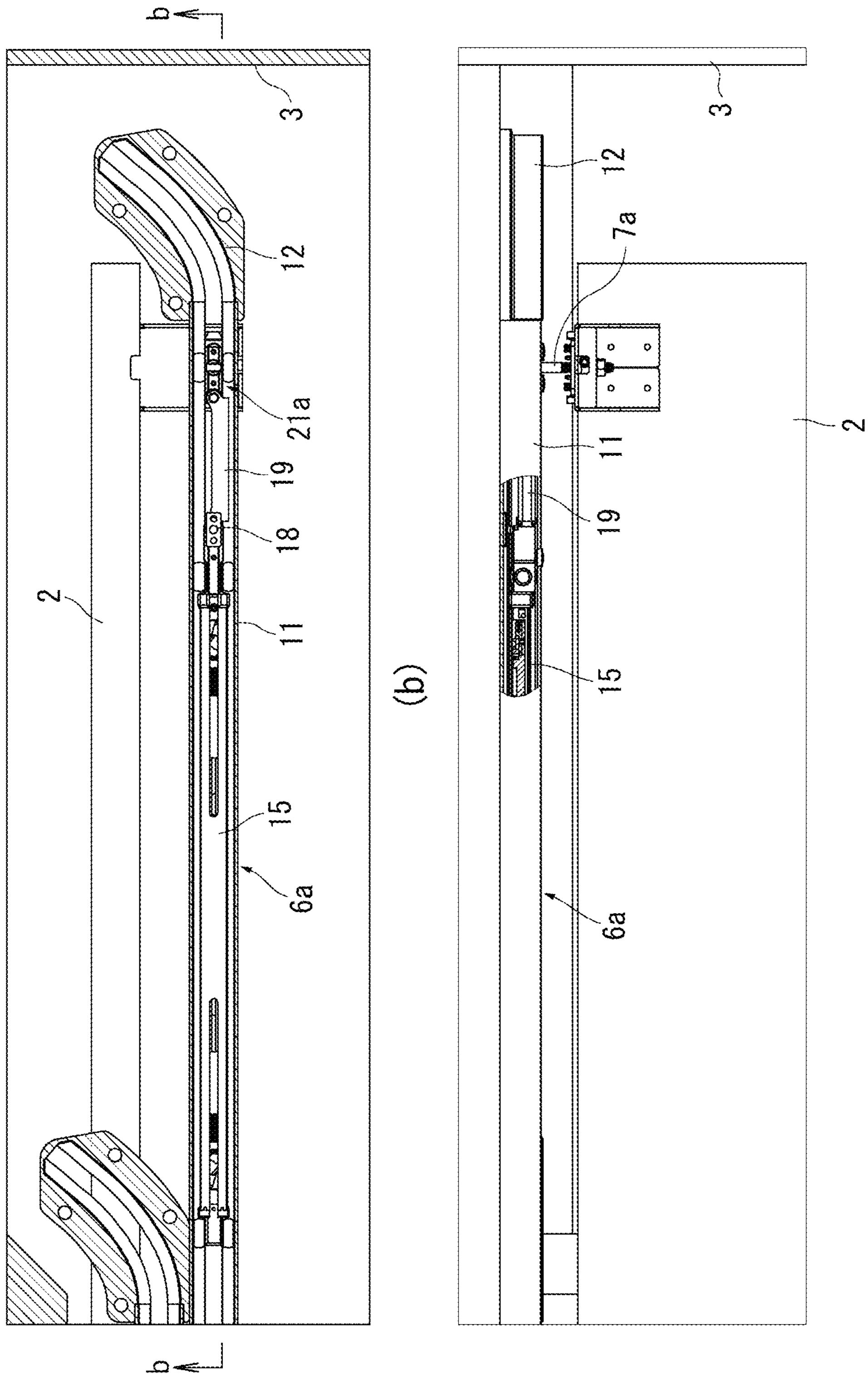

[Fig. 7]
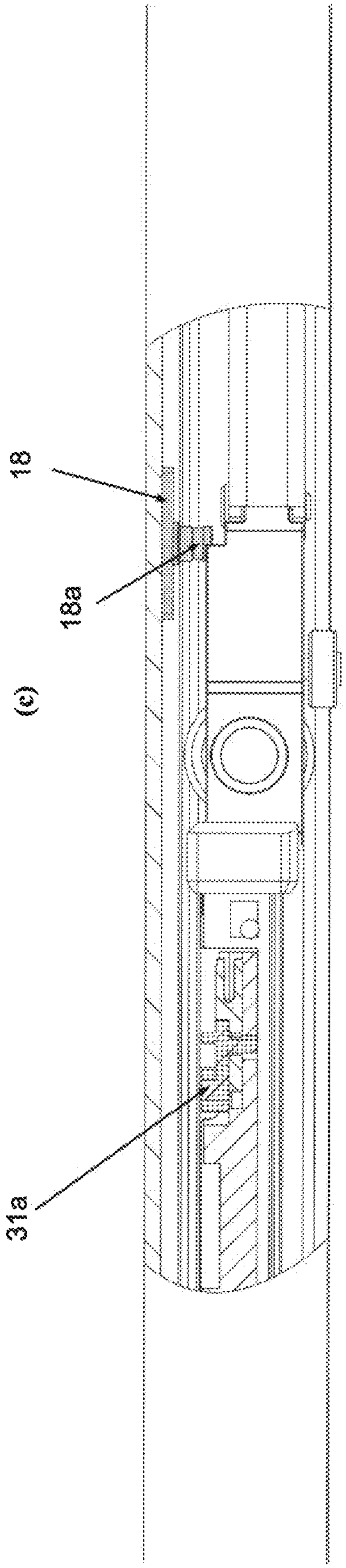

[Fig. 8]
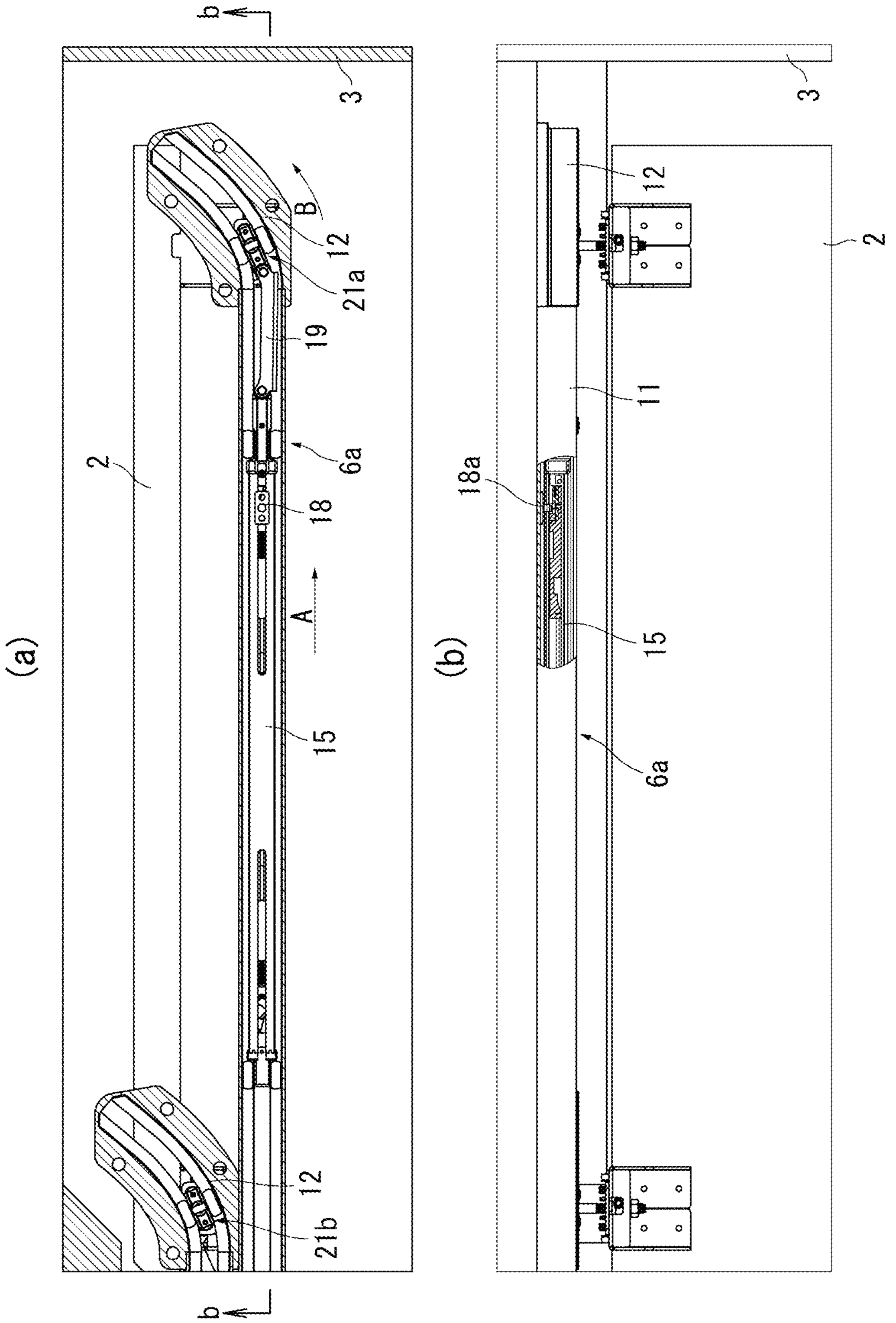

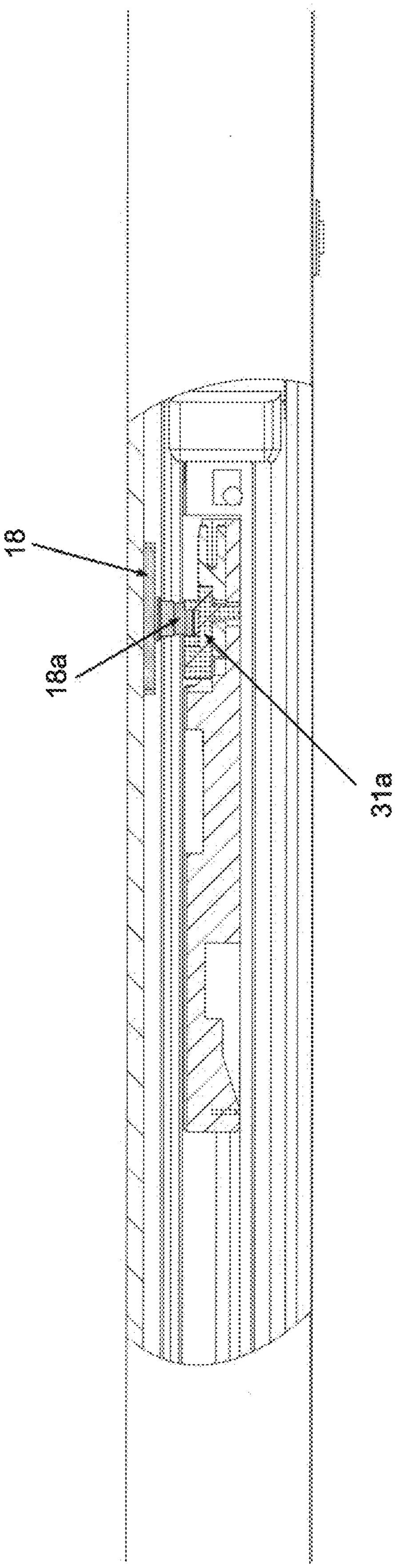
(c)
[Fig. 8]

[Fig. 9]
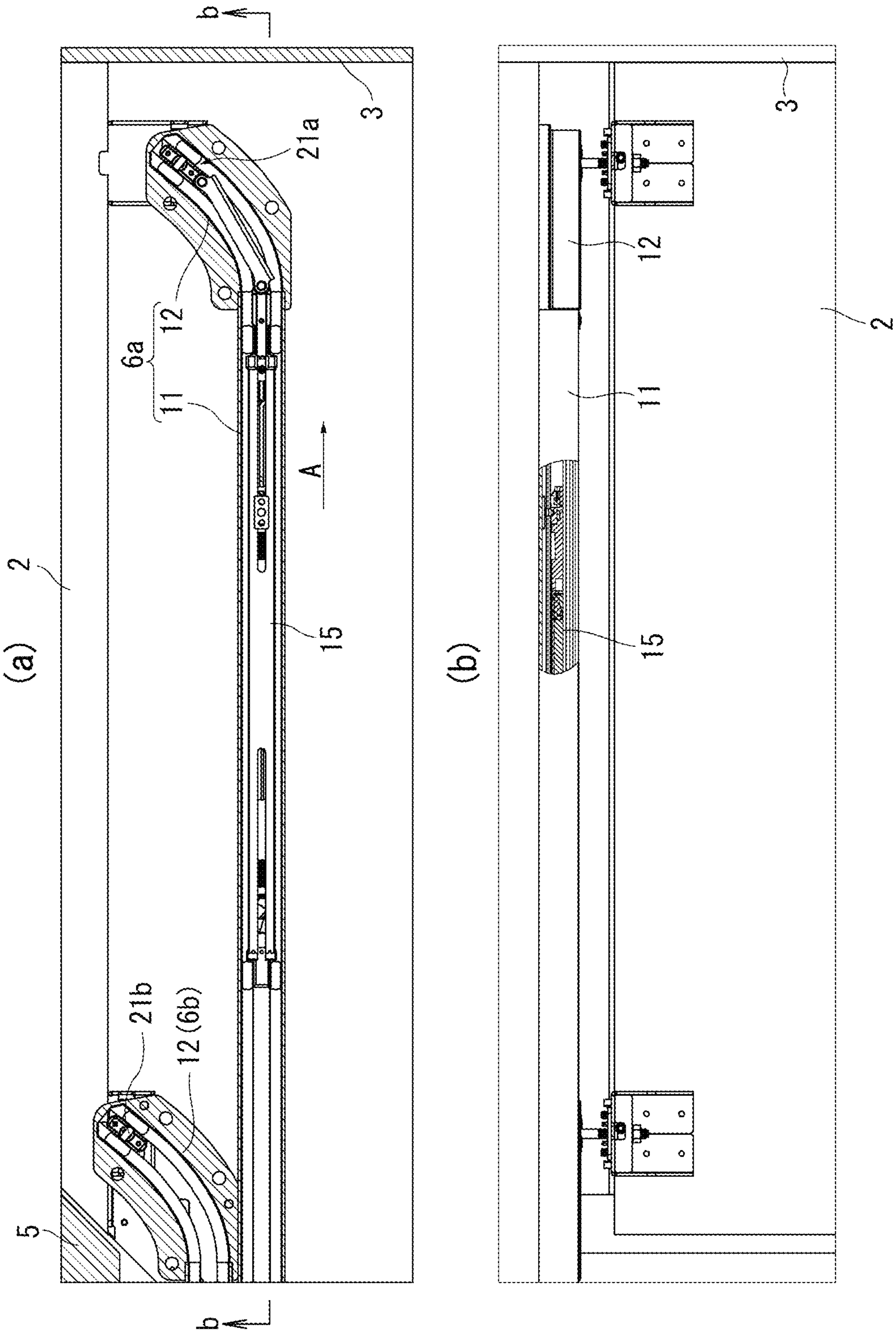

[Fig. 9]
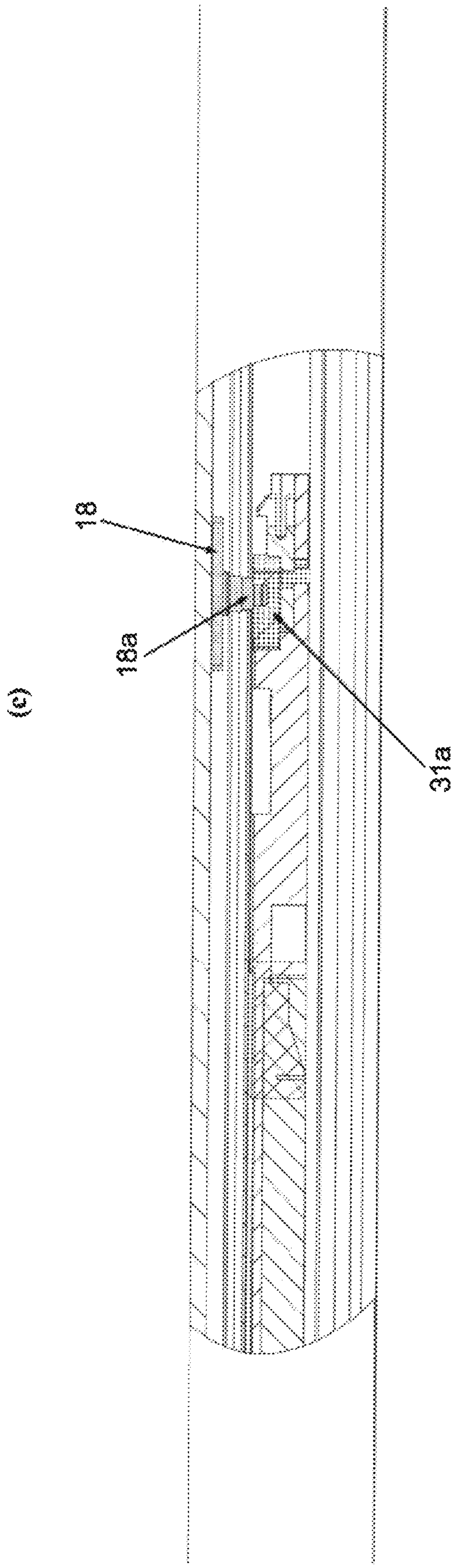

[Fig. 10]
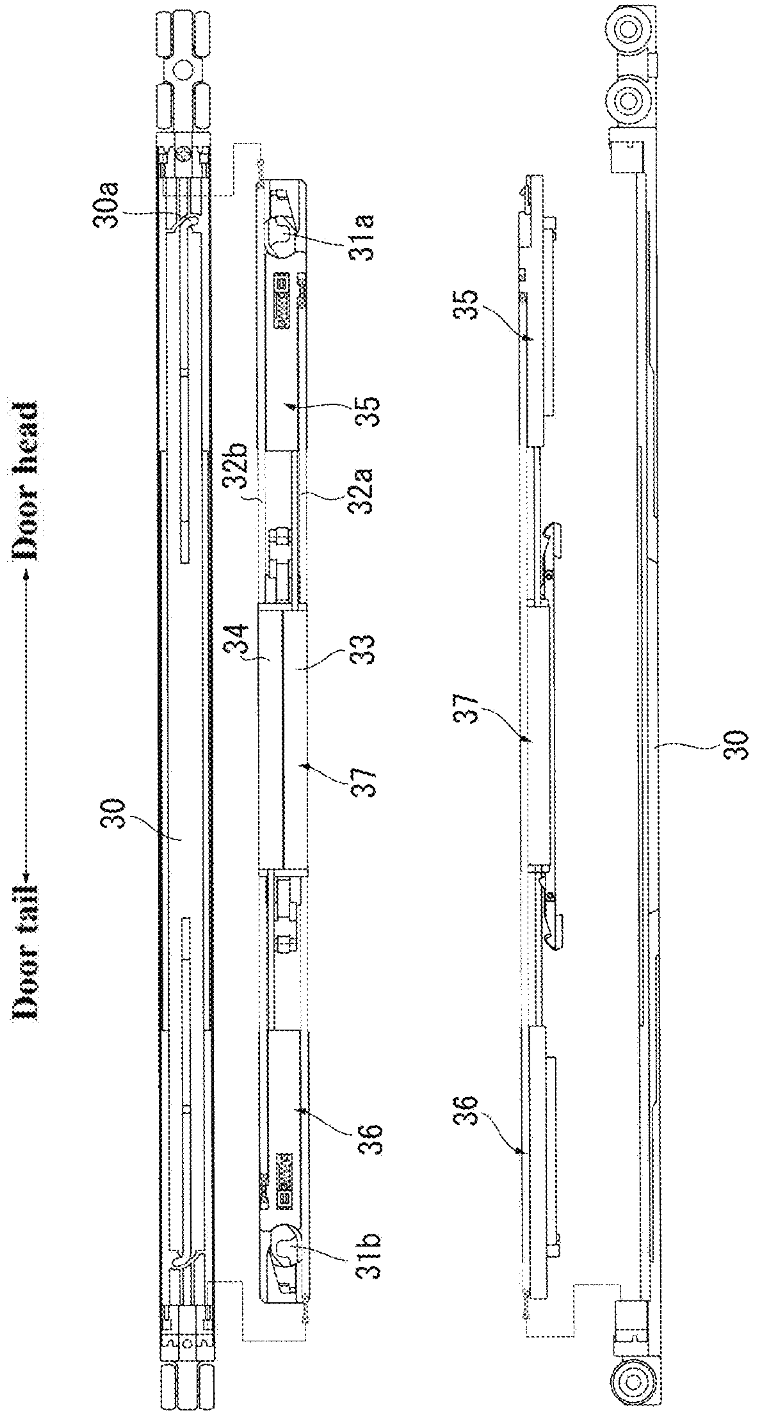

[Fig. 11]
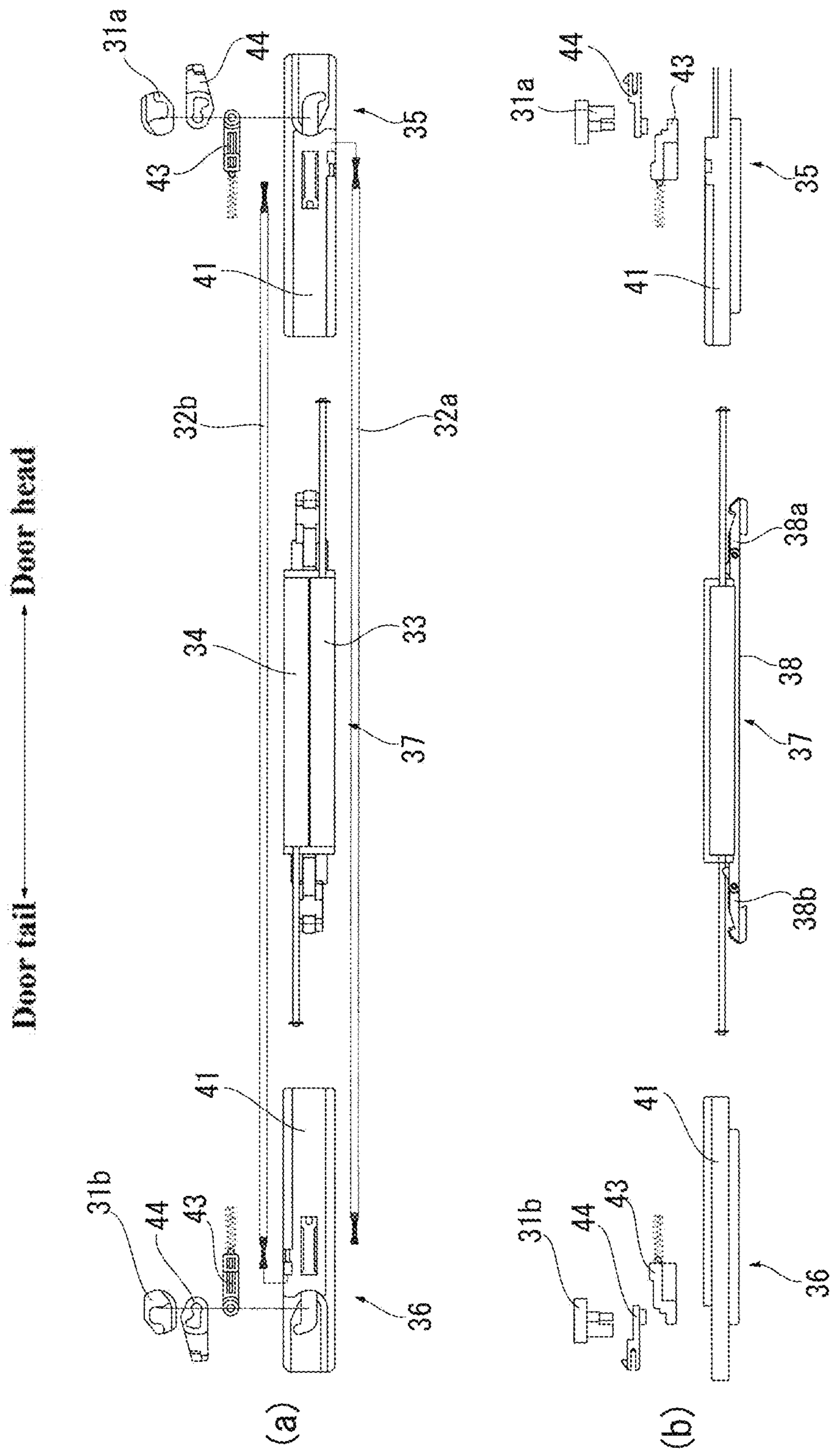

[Fig. 12]
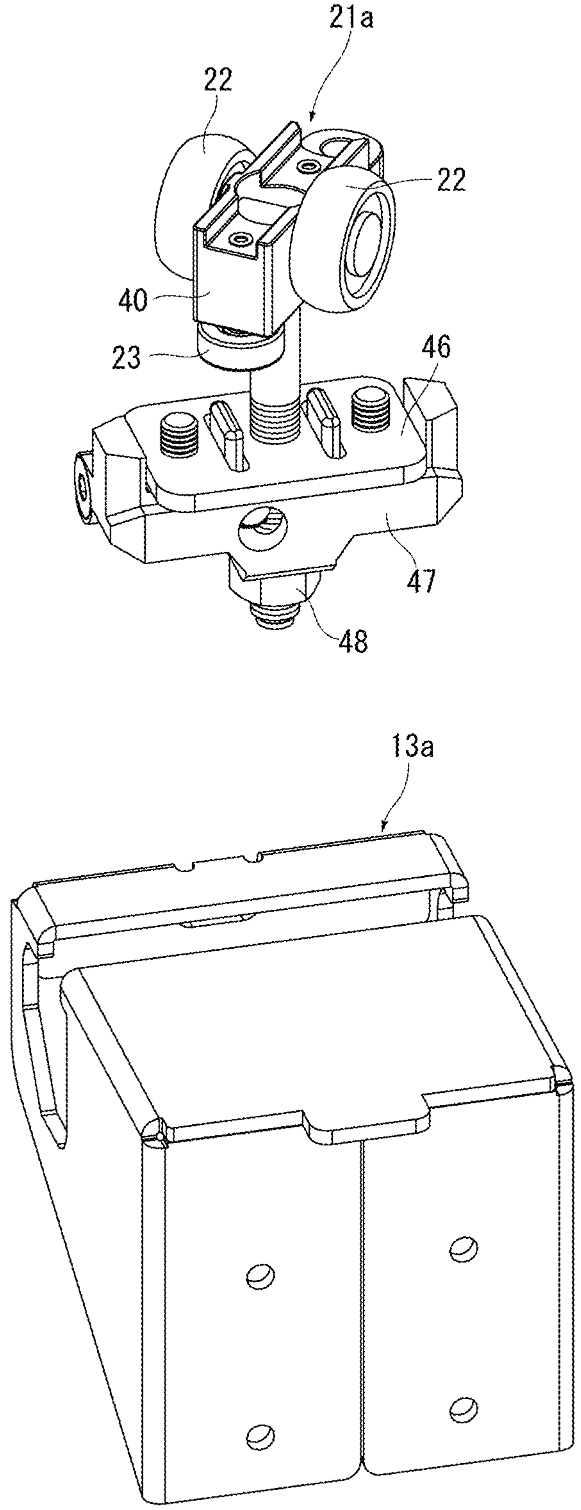

[Fig. 13]
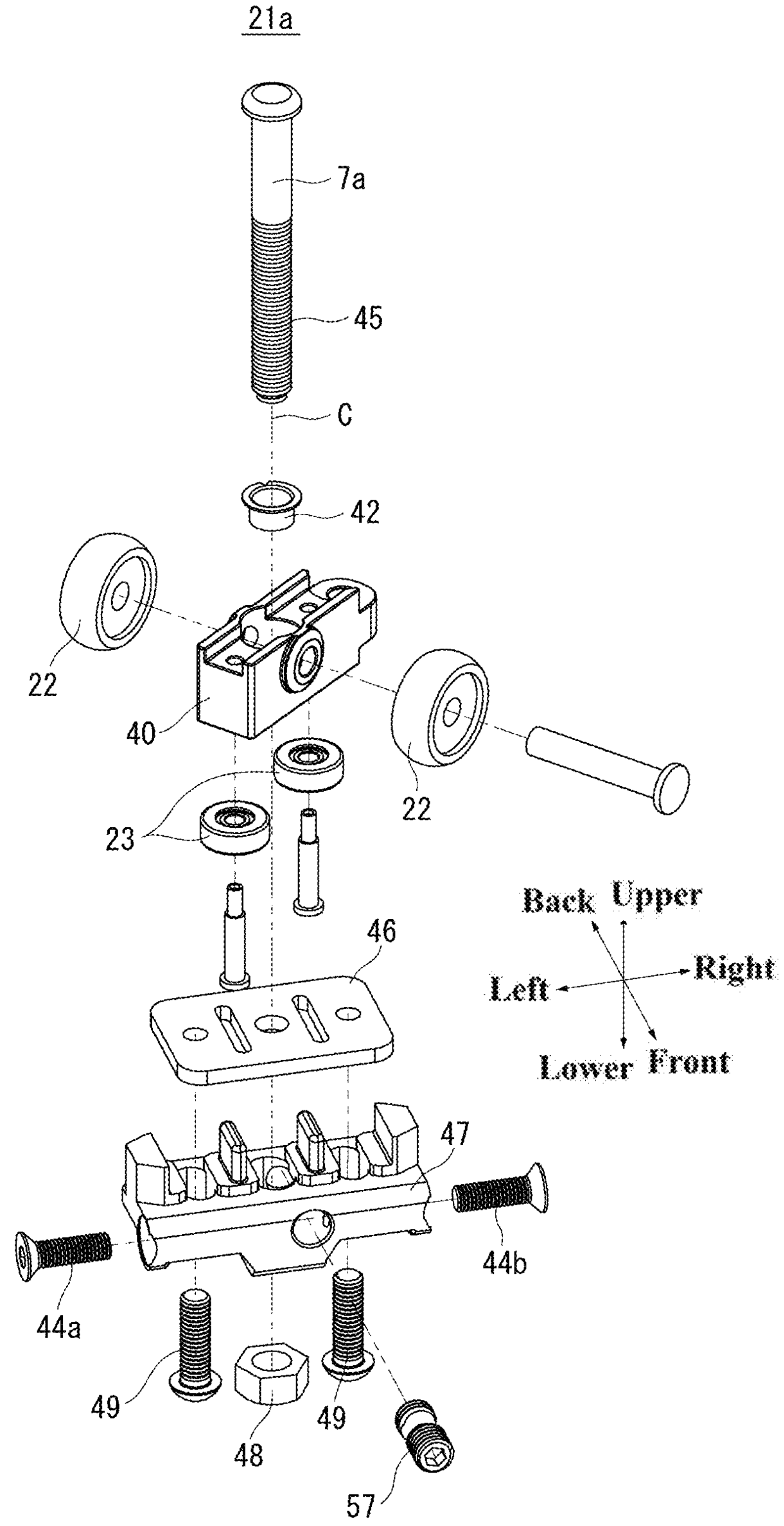

[Fig. 14]
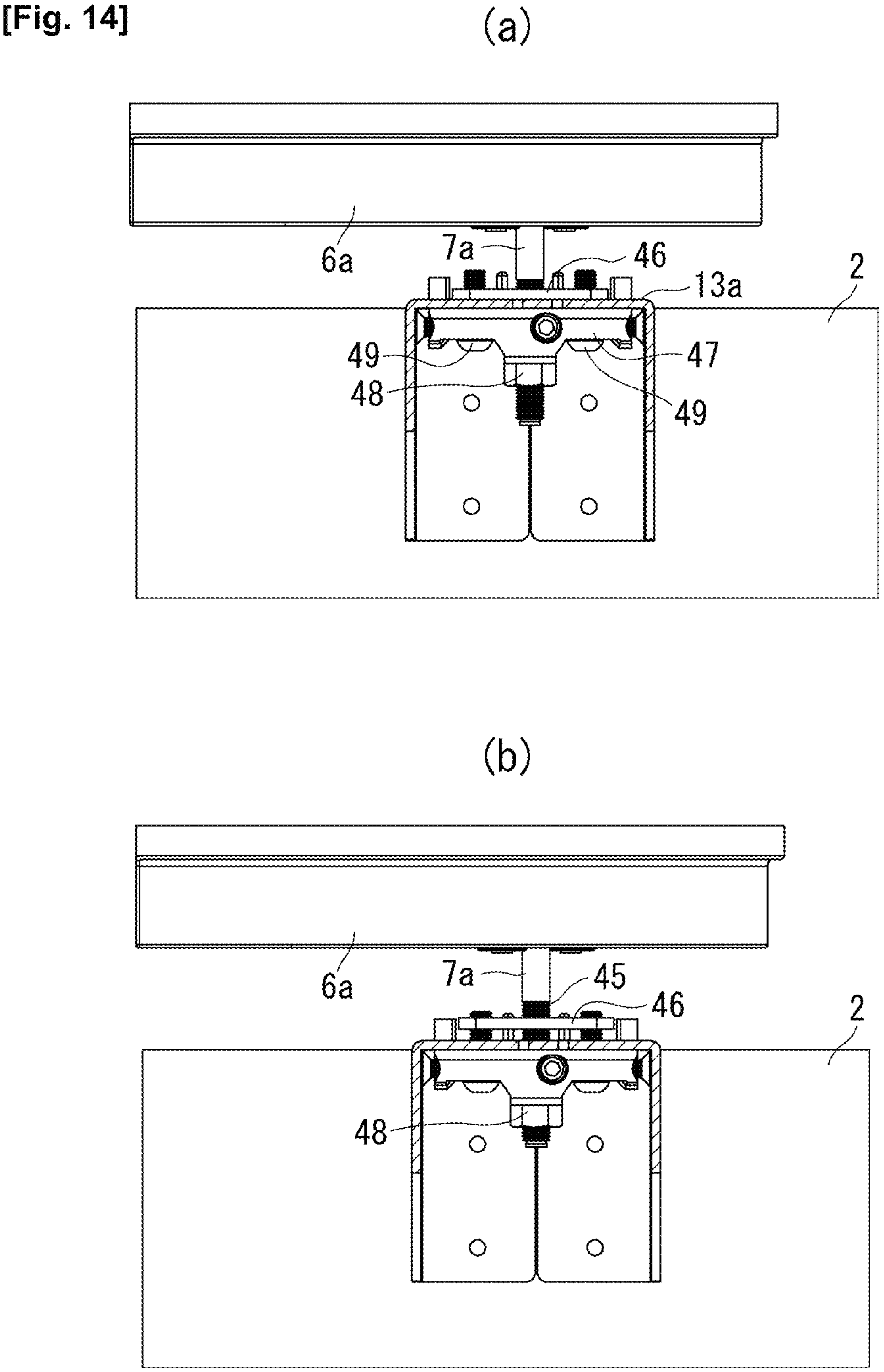

[Fig. 15]
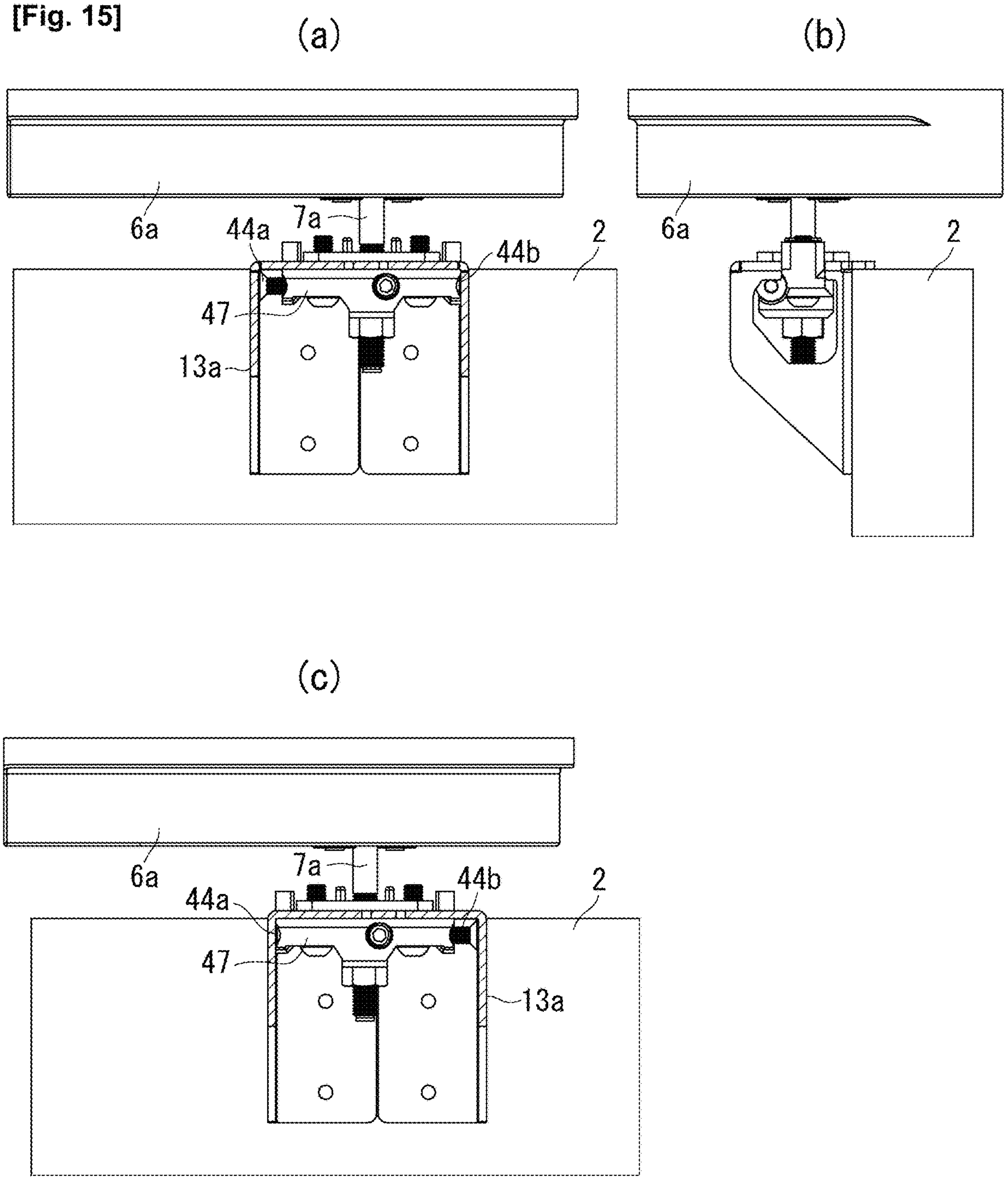

[Fig. 16]
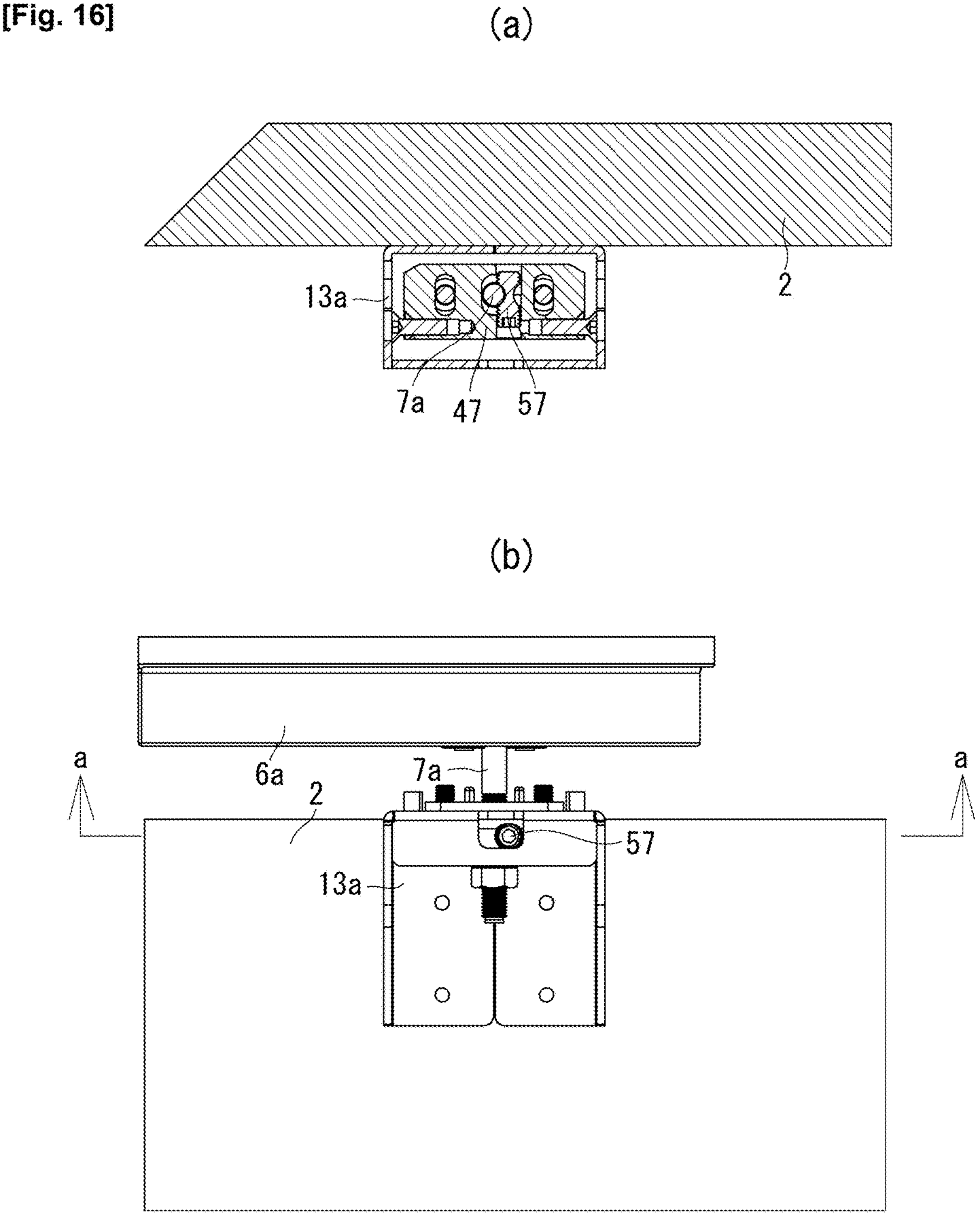

[Fig. 17]
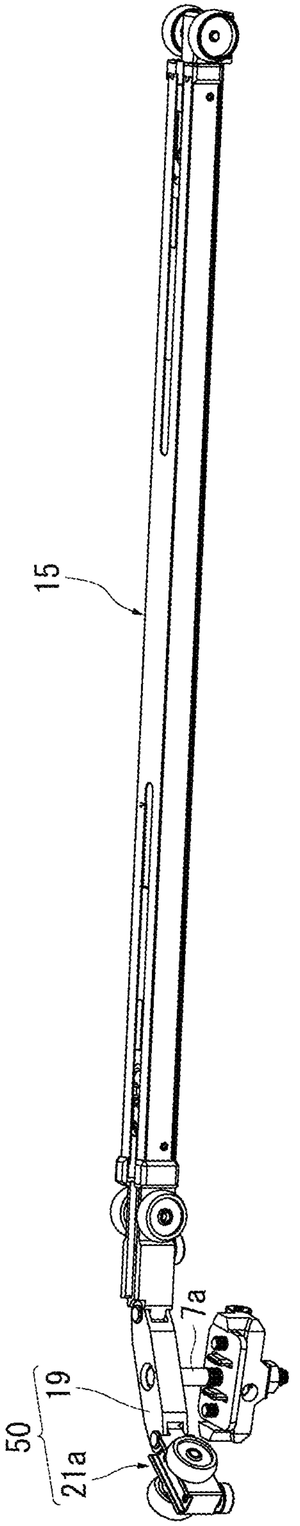

[Fig. 18]
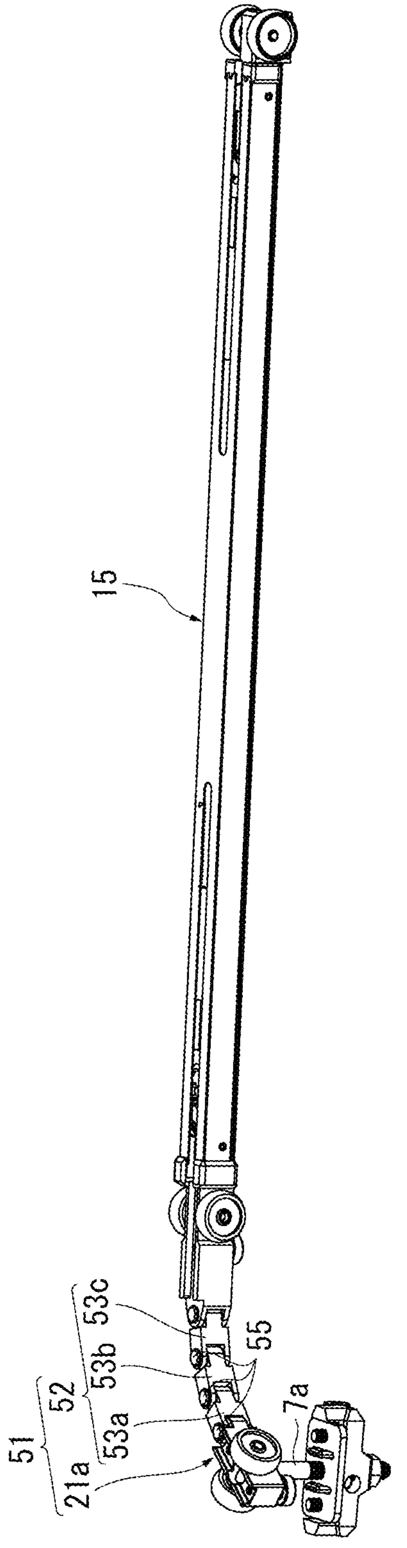

[Fig. 19]
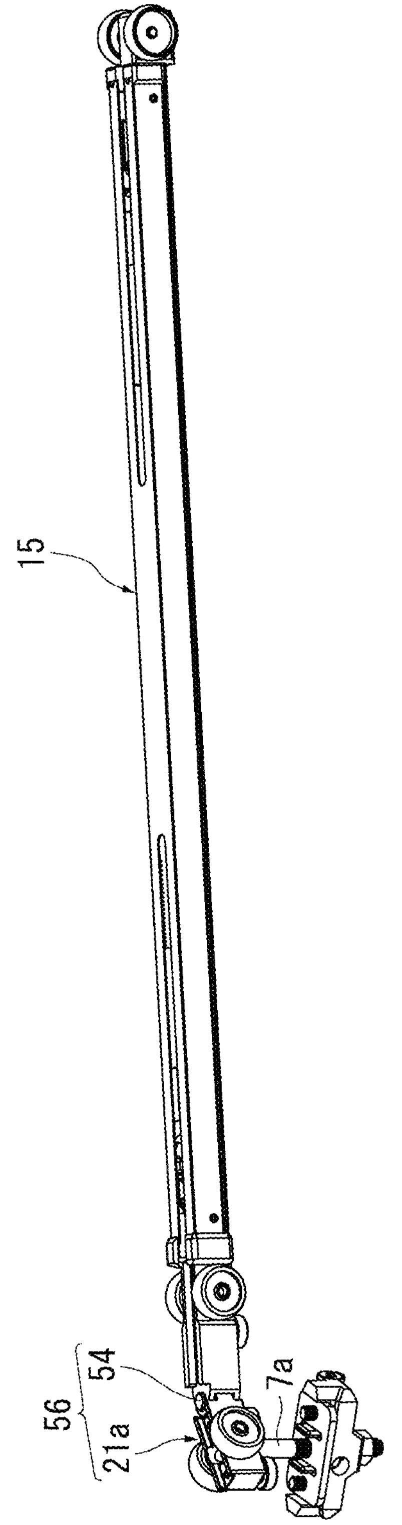

[Fig. 20]
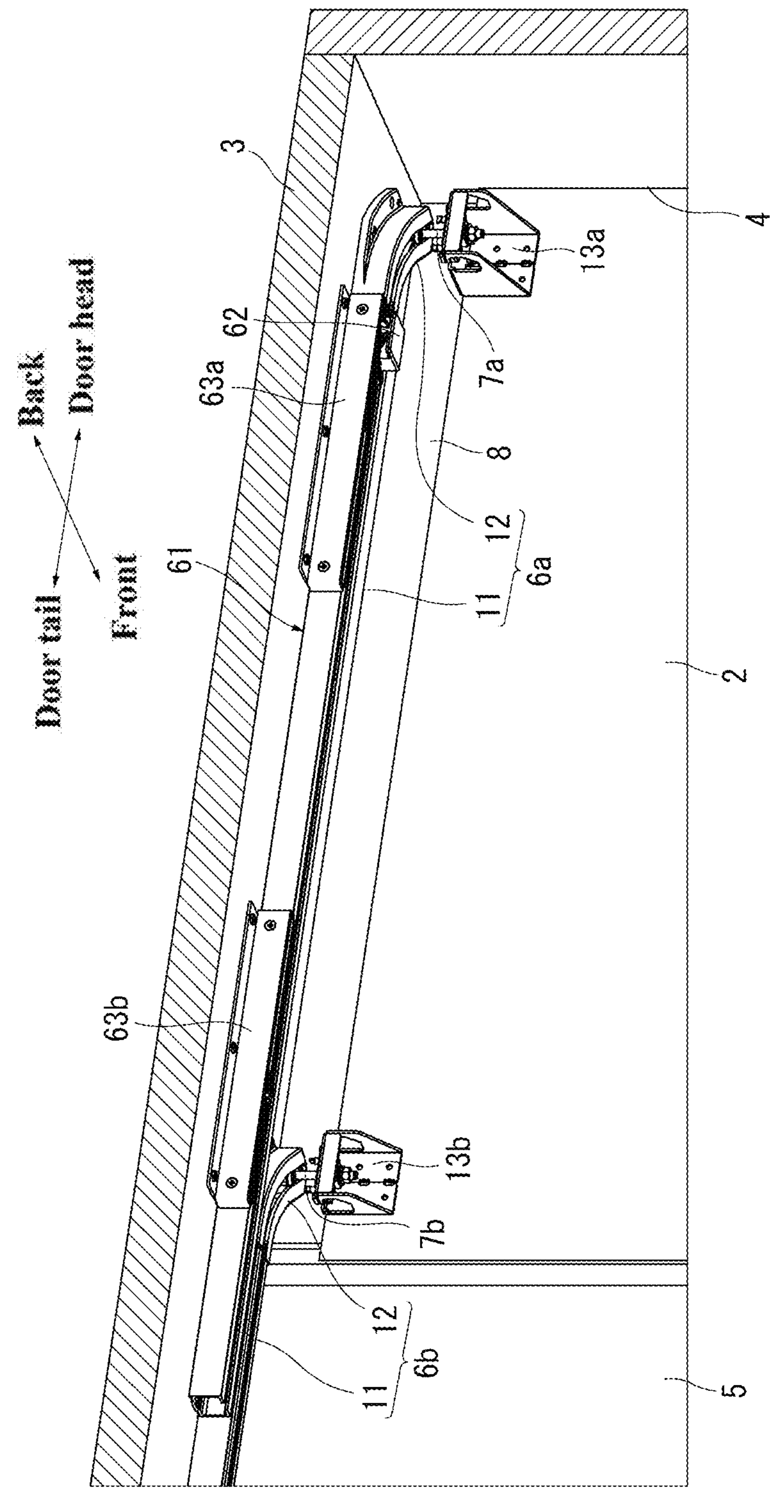

[Fig.21]
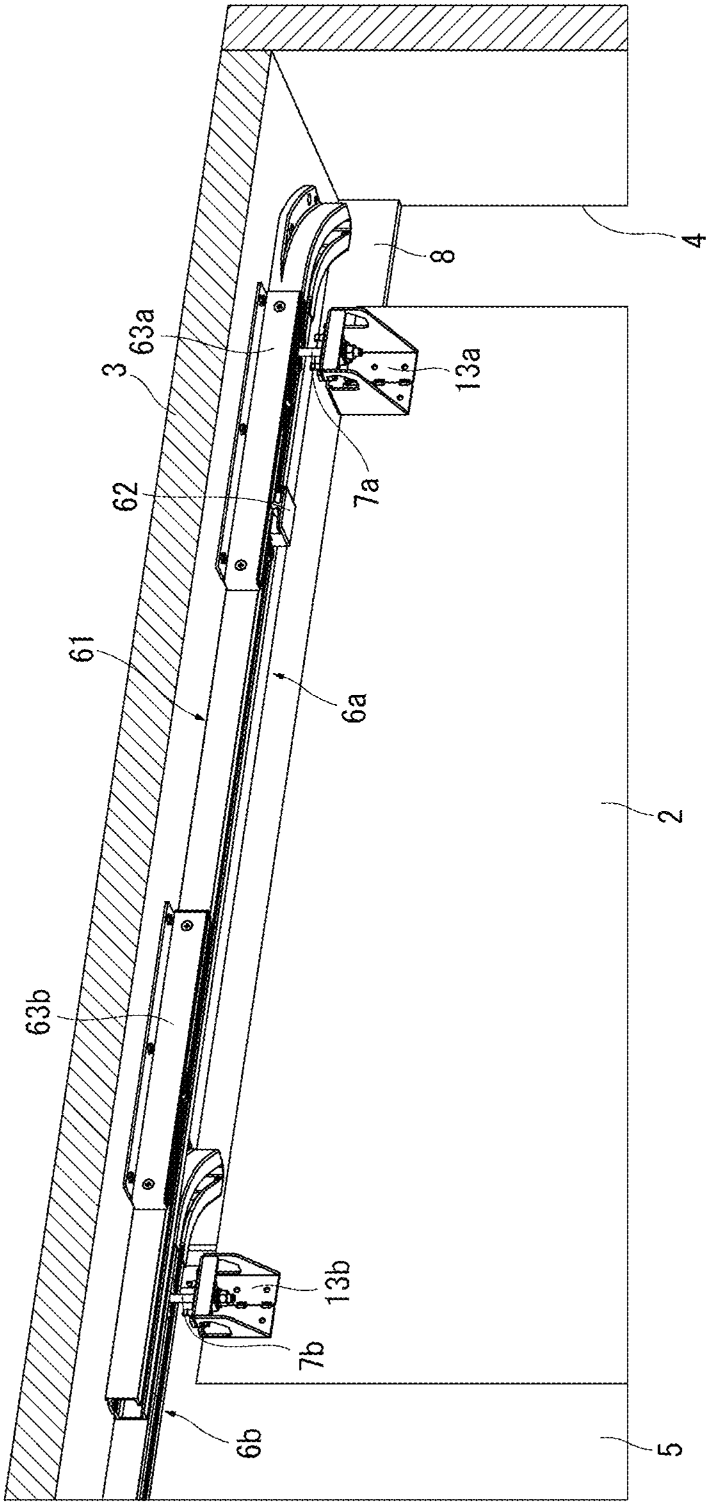

[Fig. 22]
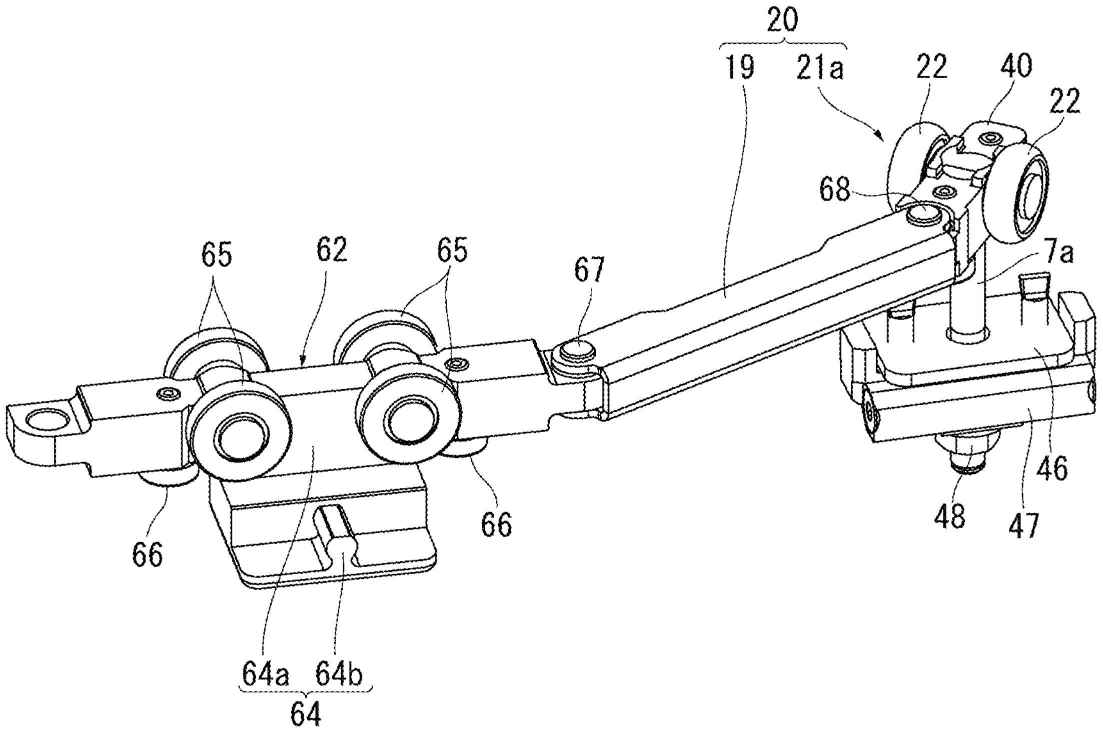

[Fig. 23]
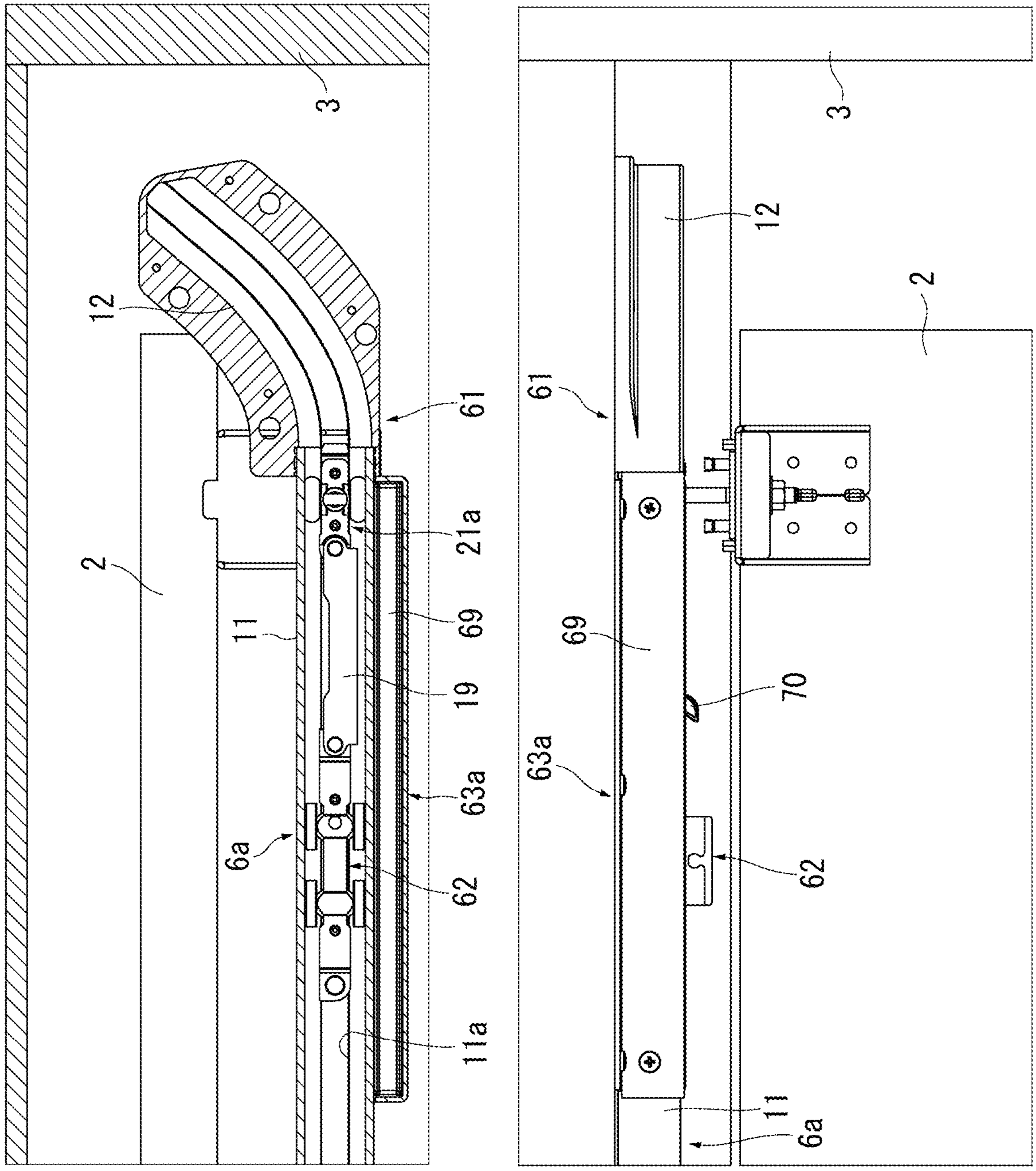
(a)
(b)

[Fig. 24]
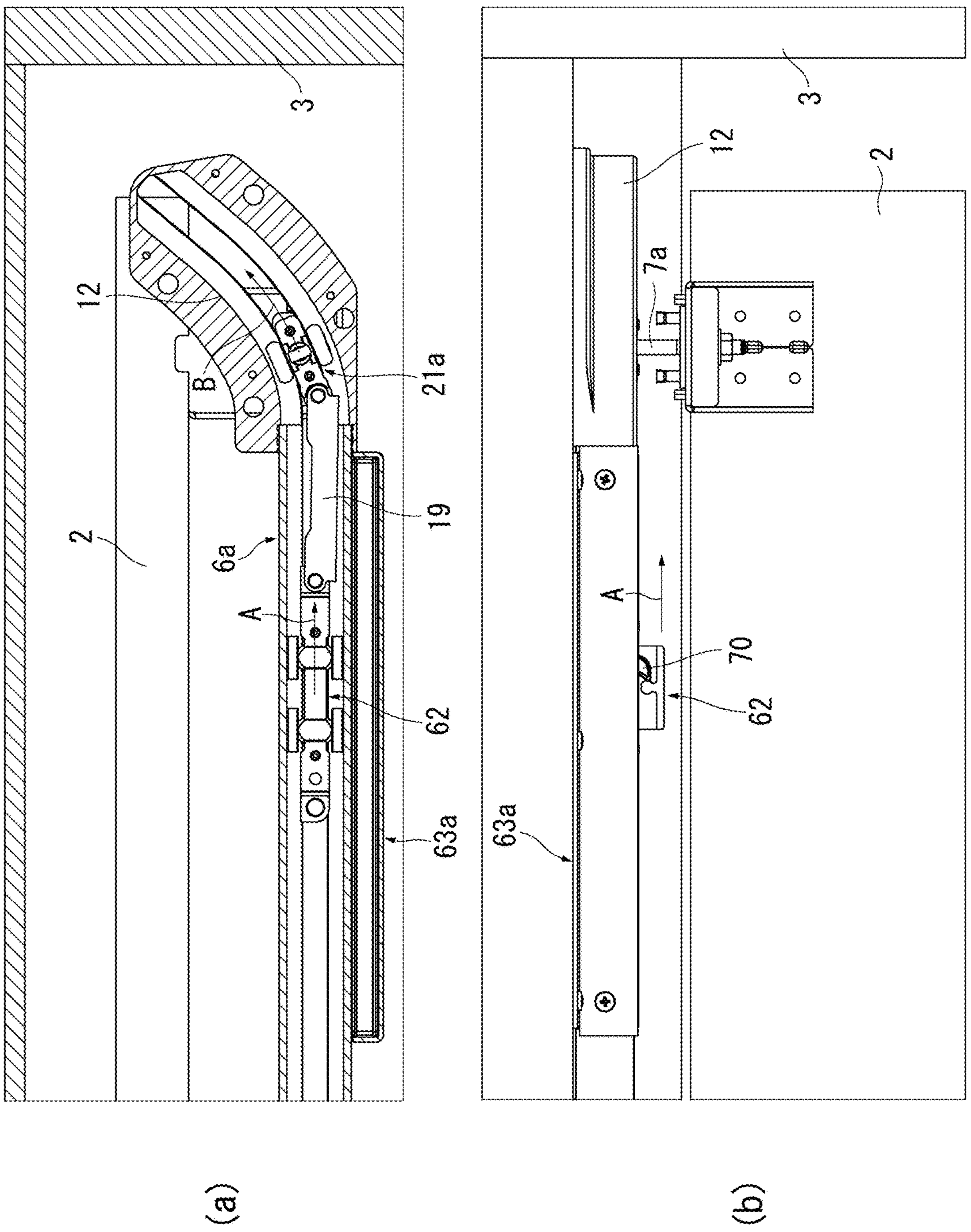

[Fig. 25]
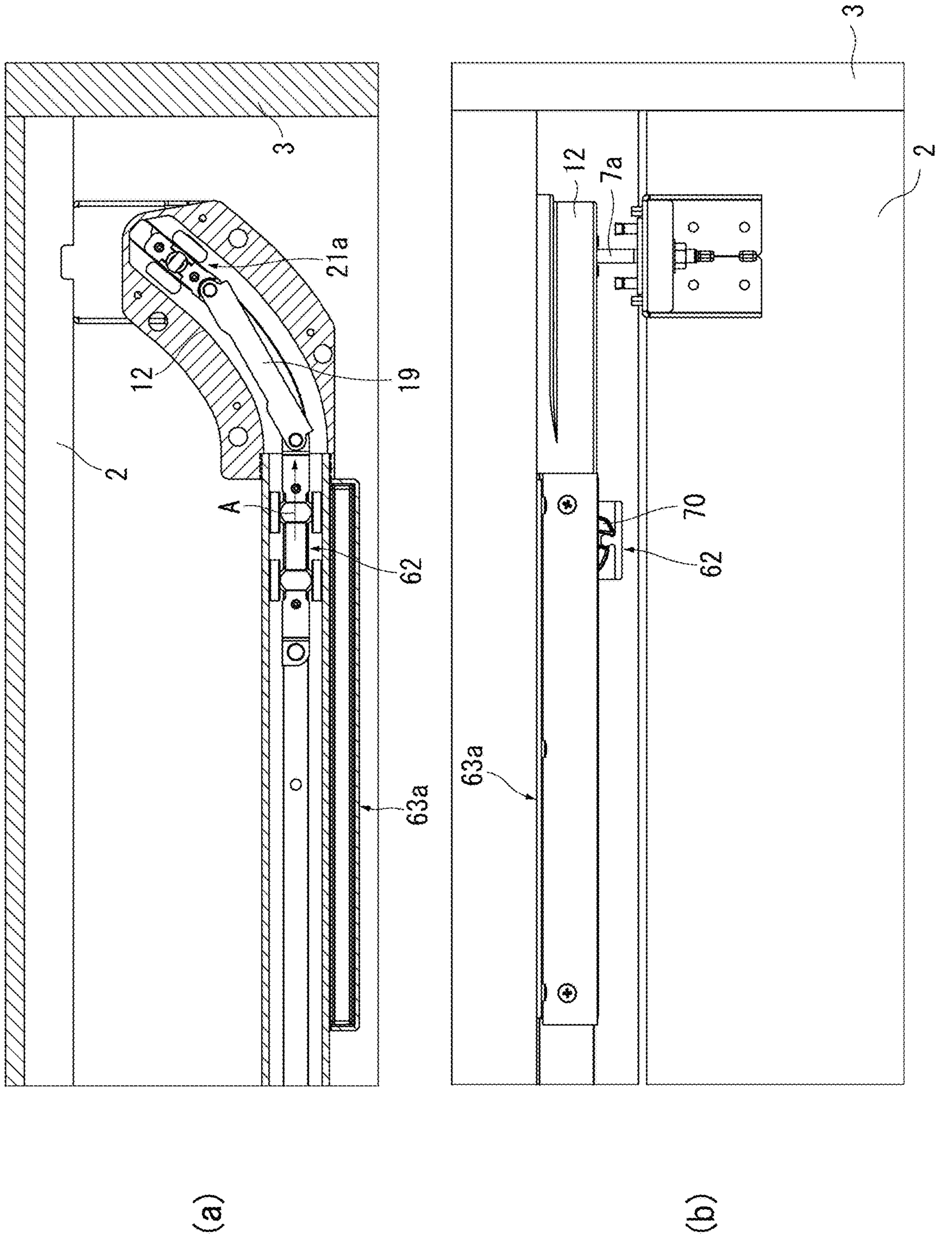

SLIDING DOOR DEVICE

RELATED APPLICATIONS

This application is the U.S. National Phase of and claims priority to International Patent Application No. PCT/JP2020/020896, International Filing Date May 27, 2020; which claims benefit of Japanese Patent Application No. 2019-147829 filed Aug. 9, 2019; both of which are incorporated herein by reference in their entireties.

TECHNICAL FIELD

The present invention relates to a sliding door device for moving a sliding door between a closed position for closing an opening and an opened position for allowing the sliding door to face a wall or the like adjacent to the opening.

BACKGROUND ART

As this type of the sliding door device, the present applicant has proposed a sliding door device described in Patent document 1. This sliding door device includes a rail for guiding a support shaft attached to the sliding door. The rail includes a straight portion for linearly guiding the support shaft and an inclined portion which is inclined with respect to the straight portion and obliquely guides the support shaft. When the rail oscillates the support shaft, the sliding door moves between the closed position for closing the opening and the opened position for allowing the sliding door to face the wall adjacent to the opening. According to this sliding door device, since the sliding door and a wall surface become flat when the sliding door is closed, it is possible to produce a clear and smart space. Further, when the sliding door is opened, it is possible to form a large opening.

The sliding door device is provided with a pull-in device for pulling the sliding door to the closed position. The pull-in device is disposed on a rail side, that is, on the inclined portion of the rail to capture a roller traveling body which has moved from the straight portion to the inclined portion and pull the support shaft attached to the roller traveling body to the closed position.

PRIOR ART DOCUMENT

Patent Document

Patent Document 1: JP 2008-285942A

SUMMARY OF THE INVENTION

Problems to be Solved by the Invention

However, since the pull-in device above is disposed on the inclined portion of the rail in the conventional sliding door device as described above, there is a problem that the inclined portion of the rail is enlarged and appearance of the inclined portion of the rail is deteriorated.

Thus, it is an object of the present invention to provide a sliding door device which can move a support shaft attached to a sliding door along an inclined portion of a rail by using a pull-in device which can linearly move along a straight portion of the rail or a trigger which can linearly move along the straight portion of the rail.

Means for Solving the Problems

To solve the above-described problem, one aspect of the present invention relates to a sliding door device comprising a rail having a straight portion for linearly guiding a support shaft attached to a sliding door and an inclined portion which is inclined with respect to the straight portion and obliquely guides the support shaft; a pull-in device which can capture a trigger provided on the rail and linearly move along the straight portion of the rail when the sliding door is closed; and a pull-in force transmission part which is coupled to the pull-in device and moves the support shaft along the inclined portion according to linear movement of the pull-in device.

To solve the above-described problem, another aspect of the present invention relates to a sliding door device comprising a rail having a straight portion for linearly guiding a support shaft attached to a sliding door and an inclined portion which is inclined with respect to the straight portion and obliquely guides the support shaft; a trigger which can be captured by a pull-in device and linearly move along the straight portion of the rail when the sliding door is closed; and a pull-in force transmission part which is coupled to the trigger and moves the support shaft along the inclined portion according to linear movement of the trigger.

Effects of the Invention

According to the one aspect of the present invention, it is possible to move the support shaft attached to the sliding door along the inclined portion of the rail by using the pull-in device which can linearly move along the straight portion of the rail.

According to the other aspect of the present invention, it is possible to move the support shaft attached to the sliding door along the inclined portion of the rail by using the trigger which can linearly moves along the straight portion of the rail.

BRIEF DESCRIPTION OF THE FIGURES

FIG. 1 is a perspective view of a sliding door device according to a first embodiment of the present invention (a state that the sliding door is in a closed position);

FIG. 2 is another perspective view of the sliding door device of the present embodiment (a state that the sliding door is opened to a predetermined position).

FIG. 3 is a perspective view of a rail (FIG. 3(*a*) is an upper surface side perspective view of the rail, FIG. 3(*b*-1) is an upper surface side perspective view of an inclined portion, FIG. 3(*b*-2) is a lower surface side perspective view of the inclined portion and FIG. 3(*c*) is an upper surface side perspective view of a straight portion).

FIG. 4 is an upper surface side perspective view of the rail, a pull-in device and a pull-in force transmission part.

FIG. 5 is an upper surface side perspective view of the pull-in device and the pull-in force transmission part.

FIG. 6(*a*) is a perspective view of a coupling portion between an arm and a roller traveling body and FIG. 6(*b*) is a perspective view of a coupling portion between the arm and the pull-in device.

FIG. 7 is an operation diagram of the sliding door device of the present embodiment (a state before the pull-in device captures the trigger, FIG. 7(*a*) is a horizontal cross-sectional view and FIG. 7(*b*) is a cross-sectional view taken along a b-b line in FIG. 7(*a*)). FIG. 7(*c*) is a close-up view.

FIG. 8 is another operation diagram of the sliding door device of the present embodiment (a state that the pull-in device captures the trigger, FIG. 8(*a*) is a horizontal cross-sectional view and FIG. 8(*b*) is a cross-sectional view taken along a b-b line in FIG. 8(*a*). FIG. 8(*c*) is a close-up view.

FIG. 9 is yet another operation diagram of the sliding door device of the present embodiment (a state that the sliding door is in the closed position, FIG. 9(*a*) is a horizontal cross-sectional view and FIG. 9(*b*) is a cross-sectional view taken along a b-b line in FIG. 9(*a*). FIG. 9(*c*) is a close-up view.

FIG. 10 is an exploded view of the pull-in device (FIG. 10(*a*) is a plan view and FIG. 10(*b*) is a side view).

FIG. 11 is another exploded view of the pull-in device (FIG. 11(*a*) is a plan view and FIG. 11(*b*) is a side view).

FIG. 12 is a perspective view of the roller traveling body and a bracket.

FIG. 13 is an exploded perspective view of the roller traveling body.

FIG. 14 is a diagram showing vertical adjustment of the bracket (FIG. 14(*a*) shows a front view of the bracket after the adjustment and FIG. 14(*b*) shows a front view of the bracket before the adjustment).

FIG. 15 is a diagram showing left-right adjustment of the bracket (FIG. 15(*a*) shows a front view of the bracket moved in the left direction, FIG. 15(*b*) shows a side view of the bracket and FIG. 15(*c*) shows a side view of the bracket moved in the right direction).

FIG. 16 is a diagram showing front-back adjustment of the bracket (FIG. 16(*a*) shows a cross-sectional view taken along an a-a line in FIG. 16(*b*) and FIG. 16(*b*) shows a front view of the bracket).

FIG. 17 is a perspective view showing a sliding door device (a pull-in device and a pull-in force transmission part) according to a second embodiment of the present invention.

FIG. 18 is a perspective view showing a sliding door device (a pull-in device and a pull-in force transmission part) according to a third embodiment of the present invention.

FIG. 19 is a perspective view showing a sliding door device (a pull-in device and a pull-in force transmission part) according to a fourth embodiment of the present invention.

FIG. 20 is a perspective view of a sliding door device according to a fifth embodiment of the present invention (in a state that the sliding door is in the closed position).

FIG. 21 is another perspective view of the sliding door device according to the fifth embodiment of the present invention (a state that the sliding door is opened to the predetermined position).

FIG. 22 is an upper surface side perspective view of a trigger and the pull-in force transmission part of the sliding door device according to the fifth embodiment of the present invention.

FIG. 23 is an operation diagram of the sliding door device according to the fifth embodiment of the present invention (a state before the pull-in device captures the trigger, FIG. 23(*a*) is a horizontal cross-sectional view and FIG. 23(*b*) is a side view).

FIG. 24 is an operation diagram of the sliding door device according to the fifth embodiment of the present invention (a state that the pull-in device captures the trigger, FIG. 24(*a*) is a horizontal cross-sectional view and FIG. 24(*b*) is a side view).

FIG. 25 is another operation diagram of the sliding door device according to the fifth embodiment of the present invention (a state that the sliding door is in the closed position, FIG. 25(*a*) is a horizontal cross-sectional view and FIG. 25(*b*) is a side view).

DETAILED DESCRIPTION OF THE INVENTION

Hereinafter, sliding door devices according to embodiments of the present invention will be described based on the accompanying drawings. However, it should be noted that the sliding door device of the present invention may be embodied in various forms and is not limited to the embodiments described in the specification. The embodiments are provided with intention of sufficiently providing the disclosure of the specification for allowing a person having ordinary skill in the art to sufficiently understand the scope of the invention.

First Embodiment

FIG. 1 and FIG. 2 show a sliding door device 1 according to a first embodiment of the present invention (an upper surface side perspective view of the sliding door 2). FIG. 1 shows a state that the sliding door 2 is in a closed position. FIG. 2 shows a state that the sliding door 2 is opened from the closed position to a predetermined position in an opening direction. In this regard, for convenience of the explanation, the following description uses a direction when the sliding door is viewed from the front side, that is a door head and door tail direction and a depth direction shown in FIG. 1 for explaining a configuration of the sliding door 1.

The reference number “3” refers to a frame, the reference number “4” refers to an opening, the reference number “5” refers to a wall, the reference numbers “6*a*”, “6*b*” respectively refer to rails and the reference numbers “7*a*”, “7*b*” respectively refer to support shafts. When the rails 6*a*, 6*b* respectively guide the support shafts 7*a*, 7*b* attached to the sliding door 2, the sliding door 2 can move between the closed position for closing the opening 4 (see FIG. 1) and an opened position for allowing the sliding door 2 to face the wall 5 adjacent to the opening 4. In this regard, the sliding door 2 can move from a predetermined position shown in FIG. 2 to the opened position located in the door tail direction in FIG. 2. A blind plate 8 for hiding the rails is provided on an upper portion of the opening 4 of the frame 4.

The rails 6*a*, 6*b* include the door head side rail 6*a* disposed on the door head side of the frame 3 and the door tail side rail 6*b* disposed on the door tail side of the frame 3. The rail 6*a* includes a straight portion 11 and an inclined portion 12 connected to an end portion of the straight portion 11 and inclined with respect to the straight portion 11. The rail 6*b* also includes a straight portion 11 and an inclined portion connected to an end portion of the straight portion 11 and inclined with respect to the straight portion 11. The rail 6*a* is disposed more to the back side and the door head side than the rail 6*b*. The straight portion 11 of the rail 6*a* and the straight portion 11 of the rail 6*b* are parallel to each other.

The support shafts 7*a*, 7*b* include the door head side support shaft 7*a* which can move on the rail 6*a* and the door tail side support shaft 7*b* which can move on the rail 6*b*. The support shaft 7*a* is supported by a roller traveling body 21*a* which can travel on the rail 6*a* (see FIG. 9). The support shaft 7*b* is supported by a roller traveling body 21*b* which can travel on the rail 6*b* (see FIG. 9). The support shaft 7*a* is attached to the door head side of the sliding door 2 through a bracket 13*a*. The support shaft 7*b* is attached to the door tail side of the sliding door 2 through a bracket 13*b*. A length of the bracket 13*a* in the depth direction is longer than a length of the bracket 13*b* in the depth direction.

As shown in FIG. 1, when the sliding door 2 is in the closed position, front surfaces of the sliding door 2 and the wall 5 viewed from the front side become flat (see FIG. 9(*a*)). When the sliding door 2 is opened, the inclined portions 12 of the rails 6*a*, 6*b* respectively oscillate the support shafts 7*a*, 7*b*, and thus the sliding door 2 moves to the back side and the door tail side. Thereafter, the straight portions 11 of the rails 6*a*, 6*b* respectively oscillate the support shafts 7*a*, 7*b*, and thus the sliding door 2 linearly moves to the opened position.

FIG. 3 shows a detailed view of the rail 6*a*. As shown in FIGS. 3(*a*)(*c*), the straight portion 11 of the rail 6*a* is formed in a cylindrical shape having a substantially C-shaped cross-section. A groove 11*a* extending in the lengthwise direction is formed in a lower portion of the straight portion 11. Rollers 16 of a pull-in device 15 (see FIG. 5) travel on both sides of the groove 11*a* and rollers 22 of a roller traveling body 21*a* (see FIG. 5) also travel. Further, an anti-vibration roller 17 of the pull-in device 15 (see FIG. 5) travels inside the groove 11*a* and an anti-vibration roller 23 of the roller traveling body 21*a* (see FIG. 5) also travels.

As shown in FIG. 3(*a*), the inclined portion 12 is connected to the straight portion 11 of the rail 6*a*. The inclined portion 12 is also formed so as to have a substantially C-shaped cross-section. A flange 12*a* is formed on an upper portion of the inclined portion 12. As shown in FIG. 3(*b*-2), a curved groove 12*b* is formed on a lower portion of the inclined portion 12. This groove 12*b* includes an arcuate groove 12*b*1 leading to the groove 11*a* of the straight portion 11 and a straight groove 12*b*2 inclined with respect to the groove 11*a*. In this regard, an entire portion of the groove 12*b* may be formed in an arcuate groove. The rollers 22 of the roller traveling body 21*a* (see FIG. 5) travel on both sides of the groove 12*b*. The anti-vibration roller 23 of the roller traveling body 21*a* (see FIG. 5) travels inside the groove 12*b*.

Since the rail 6*b* (see FIG. 1) has the substantially same configuration as the rail 6*a*, the same reference numbers are attached to components of the rail 6*b* and the description for the rail 6*b* will be omitted.

FIG. 4 shows the rail 6*a* and the pull-in device 15 and FIG. 5 shows the pull-in device 15. The pull-in device 15 is disposed only on the rail 6*a* and not disposed on the rail 6*b* (see FIG. 9(*a*)). Note that the pull-in device 15 may be disposed only on the rail 6*b* or the pull-in device 15 may be disposed on both of the rail 6*a* and the rail 6*b*.

The reference number "18" refers to a trigger provided on the rail 6*a*. The trigger 18 is fastened to the rail 6*a* or the frame 3 by a screw or the like not shown in the drawings. When the sliding door 2 is closed, the pull-in device 15 captures the trigger 18 and linearly moves along the straight portion 11 of the rail 6*a*. A moving direction of the pull-in device 15 and a transmission direction of pull-in force of the pull-in device 15 are indicated by an arrow A. After capturing the trigger 18, the pull-in device 15 moves to the closed position shown in FIG. 4.

As shown in FIG. 5, the pull-in force transmission part 20 includes the roller traveling body 21*a* and an arm 19 rotatably coupled to the roller traveling body 21*a* and the pull-in device 15. The arm 19 is constituted of one link. As shown in FIG. 6(*b*), one end portion of the arm 19 is coupled to an end portion of the pull-in device 15 so as to be capable of rotating around a vertical shaft 26. As shown in FIG. 6(*a*), another end portion of the arm 19 is coupled to the roller traveling body 21*a* so as to be capable of rotating around a vertical shaft 25.

FIG. 7 to FIG. 9 show operation diagrams of the sliding door device 1 when the sliding door 2 is closed. As shown in FIG. 7, when the sliding door 2 is closed, the pull-in device 15 moves along the straight portion 11 of the rail 6*a* together with the sliding door 2. FIG. 7 shows a state before the pull-in device 15 captures the trigger 18.

As shown in FIG. 8, when the pull-in device 15 captures a shaft portion 18*a* of the trigger 18, the pull-in device 15 generates the pull-in force in the direction of the arrow A and thus linearly moves in the direction of the arrow A. The pull-in force of the pull-in device 15 is transmitted to the roller traveling body 21*a* through the arm 19. The roller traveling body 21*a* moves in a direction of an arrow B along the inclined portion 12 of the rail 6*a*. According to the movement of the roller traveling body 21*a* in the direction of the arrow B, the roller traveling body 21*b* also moves. Since the support shafts 7*a*, 7*b* (see FIG. 1) are respectively attached to the roller traveling bodies 21*a*, 21*b*, the support shafts 7*a*, 7*b* move along the inclined portions 12. Therefore, it becomes possible to obliquely pull the sliding door 2 in the direction of the arrow B.

As shown in FIG. 9, when the pull-in device 15 further moves in the direction of the arrow A, the roller traveling body 21*a* moves to the vicinity of a tip end portion of the inclined portion 12 and thus the sliding door 2 moves to the closed position. The closed position of the sliding door 2 is held by the pull-in force of the pull-in device 15. When the sliding door 2 is opened, an operation opposite to the above-described operation is performed.

One example of the configuration of the pull-in device 15 will be described below. FIG. 10 is an exploded view of the pull-in device 15. The pull-in device 15 has a base configuration including a base 30, a catcher 31*a* which can relatively slide with respect to the base 30 and a spring 32*a* disposed between the base 30 and the catcher 31*a*. When the catcher 31*a* captures the trigger 18, the catcher 31*a* rotates to release engagement between the catcher 31*a* and the curved groove 30*a* of the base 30 and thus the base 30 moves to the door head direction in the drawing due to spring force of the spring 32*a*. Movement of the base 30 is braked by a first linear damper 33 and a second linear damper 34.

In this embodiment, two pairs of catchers 31*a*, 31*b* and springs 32*a*, 32*b* are provided so as to generate the pull-in force not only when the sliding door 2 is closed but also when the sliding door 2 is opened. In this regard, one pair of the catcher 31*a* and the spring 32*a* may be provided so as to generate the pull-in force only when the sliding door 2 is closed.

Hereinafter, a more detailed configuration of the pull-in device 15 will be described. A first slider assembly 35 and a second slider assembly 36 are slidably provided on the base 30. A damper assembly 37 is slidably provided between the first slider assembly 35 and the second slider assembly 36. A cover 39 (see FIG. 5) is attached to the base 30. A groove 39*a* for receiving the shaft portion 18*a* of the trigger 18 is formed on the cover 39.

FIG. 11 shows exploded views of the first slider assembly 35, the second slider assembly 36 and the damper assembly 37. The first slider assembly 35 includes a slider body 41, the catcher 31*a*, a pusher 43 and a malfunction prevention cam 44.

As described above, the catcher 31*a* engages with the curved groove 30*a* of the base 30, and thereby a standby position of the catcher 31*a* is maintained. The pusher 43 pushes the catcher 31*a* so as to hold the catcher 31*a* in the standby position. The slider body 41 is provided to stabilize relative sliding of the catcher 31*a* with respect to the base 30.

The malfunction prevention cam 44 is provided to return the catcher 31*a* to the standby position when the catcher 31*a* is left from the standby position due to malfunction.

Similarly to the first slider assembly 35, the second slider assembly 36 includes a slider body 41, the catcher 31*b*, a pusher 43 and a malfunction prevention cam 44. Since configurations of these components are substantially the same as those of the first slider assembly 35, the same reference numbers are attached to them and description for them will be omitted.

As shown in FIG. 11, the damper assembly 37 includes a first linear damper 33, a second linear damper 34 and a damper base 38 on which the first linear damper 33 and the second linear damper 34 are disposed. Damper locks 38*a*, 38*b* are provided on the damper base 38.

When the first slider assembly 35 relatively slides with respect to the base 30, a distance between the damper base 38 and the first slider assembly 35 first decreases and the first linear damper 33 operates. Thereafter, the damper lock 38*a* is released, the damper base 38 slides together with the first slider assembly 35, a distance between the second slider assembly 36 and the damper base 38 decreases, and the second linear damper 34 operates. When the second slider assembly 36 relatively slides with respect to the base 30, the second linear damper 34 first operates and then the first linear damper 33 operates.

Note that the above-described configuration of the pull-in device 15 is merely one example. The pusher 43, the malfunction prevention cam 44, the slider body 41 and the damper assembly 37 may be omitted.

Hereinafter, description will be given to one example of the configuration of the roller traveling body 21*a*. FIG. 12 shows the roller traveling body 21*a* and the bracket 13*a*. FIG. 13 shows an exploded view of the roller traveling body 21*a*. The roller traveling body 21*a* includes a main body 40, the pair of left and right rollers 22 rotatably disposed on side surfaces of the main body 40 respectively and the anti-vibration roller 23 rotatably disposed on a lower surface of the main body 40. The above-described arm 19 is coupled to the main body 40.

The support shaft 7*a* is supported by the main body 40. The support shaft 7*a* can rotate with respect to the main body 40 around a center line c. A bushing 42 for smoothing the rotation of the support shaft 7*a* is incorporated in the main body 40.

The bracket 13*a* (see FIG. 12) is attached to the support shaft 7*a* so that a position of the bracket 13*a* can be adjusted in three-dimensional directions (vertical, left and right, and front and rear directions in FIG. 13). The reference number "57" refers to a front-back adjustment screw and the reference numbers "44*a*", "44*b*" respectively refer to left-right adjustment screws. The reference number "45" refers to a vertical adjustment screw formed on the support shaft 7*a*. The reference number "46" refers to a plate and the reference number "47" refers to a bracket support body. The bracket 13*a* is sandwiched between the plate 46 and the bracket support body 47 (see FIG. 14(*a*)).

The vertical adjustment of the bracket 13*a* is performed as follows. As shown in FIG. 14(*b*), by fitting the vertical adjustment screw 45 of the support shaft 7*a* into a screwed hole of the plate 46 and rotating the support shaft 7*a*, the plate 46 moves in the vertical direction. As shown in FIG. 14(*a*), by tightening a nut 48 to sandwich the bracket 13*a* between the plate 46 and the bracket support body 47, the bracket 13*a* is fixed to the plate 46.

The left-right adjustment of the bracket 13*a* is performed as follows. As shown in FIG. 15(*a*), by tightening the right-side left-right adjustment screw 44*b* fitted into the bracket support body 47 and tightening the left-side left-right adjustment screw 44*a*, the bracket 13*a* moves in the left direction with respect to the bracket support body 47. As shown in FIG. 15(*c*), by tightening the left-side left-right adjustment screw 44*a* fitted into the bracket support body 47 and tightening the right-side left-right adjustment screw 44*b*, the bracket 13*a* moves in the right direction in the drawing with respect to the bracket support body 47.

The front-back adjustment of the bracket 13*a* is performed as follows. As shown in FIG. 16(*a*), the front-back adjustment screw 57 is formed in a drum shape having a recessed central portion. The support shaft 7*a* engages with the recessed portion of the front-back adjustment screw 57. By tightening or loosening the front-back adjustment screw 57 fitted into the bracket support body 47, the bracket support body 47 and the bracket 13*a* move in the front direction or the back direction with respect to the support shaft 7*a*.

Once the vertical, left-right and front-back adjustments of the bracket 13*a* are completed, a fixing screw 49 is tightened to the plate 46 to fix the bracket 13*a* to the plate 46 as shown in FIG. 14(*a*). In this regard, the bracket 13*a* may be directly fixed to the support shaft 7*a* without providing the above-described three-dimensional adjustment structure.

Since the roller traveling body 21*b* (see FIG. 9) has substantially the same configuration as the roller traveling body 21*a*, description for the roller traveling body 21*b* will be omitted.

The configuration of the sliding door device 1 of the present embodiment has been described. According to the sliding door device 1 of the present embodiment, the following effects can be obtained.

Since the pull-in force transmission part 20 is coupled to the pull-in device 15, it is possible to move the support shaft 7*a* attached to the sliding door 2 along the inclined portion 12 of the rail 6*a* by using the pull-in device 15 which can linearly move along the straight portion 11 of the rail 6*a*.

Since the pull-in force transmission part 20 includes the arm 19 rotatably coupled to the roller traveling body 21*a* and the pull-in device 15, it is possible to move the roller traveling body 21*a* to the vicinity of the tip end portion of the inclined portion 12 of the rail 6*a*.

Since the arm 19 is constituted of the one link, it is possible to simplify the configuration of the arm 19.

Since the support shaft 7*a* is supported by the roller traveling body 21*a*, it is possible to move the support shaft 7*a* to the vicinity of the tip end portion of the inclined portion 12 of the rail 6*a* together with the roller traveling body 21*a*.

Second Embodiment

FIG. 17 shows a pull-in device 15 and a pull-in force transmission part 50 according to a second embodiment of the present invention. In the first embodiment, the support shaft 7*a* is supported by the roller traveling body 21*a*, whereas in the second embodiment, the support shaft 7*a* is supported by the arm 19. The other configurations are substantially the same as those of the first embodiment, and thus the same reference numbers are attached them and description for them will be omitted.

Third Embodiment

FIG. 18 shows a pull-in device 15 and a pull-in force transmission part 51 according to a third embodiment of the present invention. In the first embodiment, the arm 19 is constituted of the one link, whereas in the third embodiment, an arm 52 is constituted of a plurality of links 53*a*, 53*b*, 53*c*. The plurality of links 53*a*, 53*b*, 53*c* are coupled so as to be capable of rotating around a vertical shaft 55. According to the third embodiment, since the arm 52 is constituted of the plurality of links 53*a*, 53*b*, 53*c*, it is possible to move the support shaft 7*a* along the inclined portion 12 even if the inclination of the inclined portion 12 of the rail 6*a* is steep.

Fourth Embodiment

FIG. 19 shows a pull-in device 15 and a pull-in force transmission part 56 according to a fourth embodiment of the present invention. In the first embodiment, the pull-in force transmission part 20 is constituted of the roller traveling body 21*a* and the arm 19, whereas in the fourth embodiment, the pull-in force transmission part 56 is constituted of the roller traveling body 21*a*. The roller traveling body 21*a* is coupled to the pull-in device 15 so as to be capable of rotating around the vertical shaft 54 without through any arms. The configuration of the roller traveling body 21*a* is substantially the same as that of the roller traveling body 21*a* of the first embodiment, and thus the same reference number is attached to it and description for it will be omitted.

Fifth Embodiment

FIG. 20 and FIG. 21 show a sliding door device 61 according to a fifth embodiment of the present invention. FIG. 20 shows a state that the sliding door 2 is in the closed position and FIG. 21 shows a state that the sliding door 2 is opened from the closed position to the predetermined position in the opening direction.

The reference number "3" refers to a frame, the reference number "4" refers to an opening, the reference number "5" refers to a wall, the reference number "8" refers to a blind plate, the reference numbers "6*a*", "6*b*" respectively refer to rails and the reference numbers "7*a*", "7*b*" respectively refer to support shafts. The rails 6*a*, 6*b* include the door head side rail 6*a* disposed on the door head side of the frame 3 and the door tail side rail 6*b* disposed on the door tail side of the frame 3. The rail 6*a* includes a straight portion 11 and an inclined portion 12 which is connected to an end portion of the straight portion 11 and inclined with respect to the straight portion 11. The rail 6*b* also includes a straight portion 11 and an inclined portion 12 which is connected to an end portion of the straight portion 11 and inclined with respect to the straight portion 11. The support shafts 7*a*, 7*b* includes the door head side support shaft 7*a* which can move on the rail 6*a* and the door tail side support shaft 7*b* which can move on the rail 6*b*. The support shaft 7*a* is supported by a roller traveling body 21*a* (see FIG. 22) which can travel on the rail 6*a*. The support shaft 7*b* is supported by a roller traveling body which can travel on the rail 6*b*. The support shaft 7*a* is attached to the door head side of the sliding door 2 through a bracket 13*a*. The support shaft 7*b* is attached to the door head side of the sliding door 2 through a bracket 13*b*. Since these configurations are the same as those of the sliding door device 1 of the first embodiment, the same reference numbers are attached to them and detailed description for them will be omitted.

In the sliding door device 1 of the first embodiment, the pull-in device 15 which can linearly move along the straight portion 11 of the rail 6*a* is used for moving the support shaft 7*a* attached to the sliding door 2 along the inclined portion 12 of the rail 6*a*, whereas in the sliding door device 61 of the fifth embodiment, a trigger 62 which can linearly move along the straight portion 11 of the rail 6*a* is used for moving the support shaft 7*a* attached to the sliding door 2 along the inclined portion 12 of the rail 6*a*. A pull-in device 63*a* for capturing the trigger 62 to pull the trigger 62 is attached to the rail 6*a*.

FIG. 23(*a*) shows a horizontal cross-sectional view of the sliding door device 61 and FIG. 23(*b*) shows a side view of the sliding door device 61. The pull-in device 63*a* is attached to the straight portion 11 of the rail 6*a*. The pull-in device 63*a* includes a base 69 extending along the straight portion 11, a catcher 70 provided on the base 69 so as to be capable of sliding in the lengthwise direction of the base 69 and a spring (not shown in the drawings) disposed between the base 69 and the catcher 70. The pull-in device 63*a* is configured so that the catcher 70 rotates when the catcher 70 captures the trigger 62 to release engagement between the catcher 70 and the base 69 and thus the catcher 70 moves in the door head direction due to spring force of the spring. It is also possible to provide a linear damper for braking the movement of the catcher 70 in the door head direction. Since the configuration of the pull-in device 63*a* itself has been known in the art, further detailed description for it will be omitted.

As shown in FIG. 20 and FIG. 21, when the sliding door 2 is closed, the trigger 62 is captured by the pull-in device 63*a* and linearly moves along the straight portion 11 of the rail 6*a*. As shown in FIG. 22, the pull-in force transmission part 20 is coupled to the trigger 62. The pull-in force transmission part 20 moves the support shaft 7*a* along the inclined portion 12 according to linear movement of the trigger 62. Note that the reference number "63*b*" in FIG. 20 refers to a pull-in device for capturing the trigger 62 to pull the trigger 62 to the door tail side. The pull-in device 63*b* is symmetrical with the pull-in device 63*a* and has substantially the same configuration as the pull-in device 63*a*. The pull-in device 63*b* generates pull-in force when the sliding door 2 is opened.

As shown in FIG. 22, the trigger 62 includes a trigger body 64, for example, four rollers 65 and, for example, two anti-vibration rollers 66. The trigger body 64 has an elongated rectangular parallelepiped body portion 64*a* contained in the straight portion 11 of the rail 6*a* and an engagement portion 64*b* which protrudes from the body portion 64*a* to the outside of the straight portion 11 of the rail 6*a* and can engage with the catcher 70 (see FIG. 23(*b*)) of the pull-in device 63*a*. The rollers 65 are rotatably attached to side surfaces of the trigger body 64 and travel on both sides of a groove 11*a* (see FIG. 23(*a*)) of the straight portion 11 of the rail 6*a*. The anti-vibration rollers 66 are rotatably attached to a bottom surface of the trigger body 64 and travel in the groove 11*a* of the straight portion 11.

The pull-in force transmission part 20 includes the roller traveling body 21*a* and an arm 19 rotatably coupled to the roller traveling body 21*a* and the trigger 62. One end portion of the arm 19 is coupled to the trigger 62 so as to be capable of rotating around a vertical shaft 67. Another end portion of the arm 19 is coupled to the roller traveling body 21*a* so as to be capable of rotating around a vertical shaft 68. Since the configuration of the roller traveling body 21*a* is the same as the roller traveling body 21*a* of the first embodiment (see FIG. 12), the same reference number is attached to it and description for it will be omitted.

FIG. 23 to FIG. 25 show operation diagrams of the sliding door device 61 when the sliding door 2 is closed. FIG. 23 shows a state before the pull-in device 63*a* captures the trigger 62. As shown in FIG. 23, when the sliding door 2 is closed, the trigger 62 moves along the straight portion 11 of the rail 6*a* together with the sliding door 2.

As shown in FIG. 24, when the pull-in device 63*a* captures the trigger 62, the pull-in device 63*a* generates pull-in force in a direction of an arrow A and thus the trigger 62 linearly moves in the direction of the arrow A. The pull-in force acting on the trigger 62 is transmitted to the roller traveling body 21*a* through the arm 19. The roller traveling body 21*a* moves along the inclined portion 12 of the rail 6*a* in a direction of an arrow B. Since the support shaft 7*a* is attached to the roller traveling body 21*a*, the support shaft 7*a* moves along the inclined portion 12. Therefore, it is possible to obliquely pull the sliding door 2 in the direction of the arrow B.

As shown in FIG. 25, when the trigger 62 further moves in the direction of the arrow A, the roller traveling body 21*a* moves to the vicinity of a tip end portion of the inclined portion 12 and thus the sliding door 2 moves to the closed position. The closed position of the sliding door 2 is held by the pull-in force of the pull-in device 63*a*. When the sliding door 2 is opened, an operation opposite to the above-described operation is performed.

The configuration of the sliding door device 61 of the present embodiment has been described. According to the sliding door device 61 of the present embodiment, the following effects can be obtained.

Since the pull-in force transmission part 20 is coupled to the trigger 62, it is possible to move the support shaft 7*a* attached to the sliding door 2 along the inclined portion 12 of the rail 6*a* by using the trigger 62 which can linearly move along the straight portion 11 of the rail 6*a*.

Since the pull-in force transmission part 20 includes the arm 19 which is rotatably coupled to the roller traveling body 21*a* and the pull-in device 63*a*, it is possible to move the roller traveling body 21*a* to the vicinity of the tip end portion of the inclined portion 12 of the rail 6*a*.

Since the arm 19 is constituted of the one link, it is possible to simplify the configuration of the arm 19.

Since the support shaft 7*a* is supported by the roller traveling body 21*a*, it is possible to move the support shaft 7*a* to the vicinity of the tip end portion of the inclined portion 12 of the rail 6*a* together with the roller traveling body 21*a*.

In this regard, it is not limited that the present invention is embodied according to the above-described embodiments and the present invention can be changed to various embodiments without changing the spirit of the present invention.

Although the sliding door is moved to the front side when the sliding door is closed in the above-described embodiments, the sliding door may be moved to the back side.

Although the sliding door and the wall surface adjacent to the opening become flat in the closed position of the sliding door in the above-described embodiments, the sliding door and another slide door adjacent to the sliding door may become flat.

Although the sliding door and the wall surface become flat in the closed position of the sliding door in the above-described embodiments, the sliding door and the wall surface may not become flat. For example, in order to improve airtightness of the opening, the sliding door may be in close contact with packing of the frame of the opening.

The present specification is based on Japanese patent application No. 2019-147829 filed on Aug. 9, 2019. The entire contents of this application are hereby incorporated.

DESCRIPTION OF REFERENCE SINGS

1, 61 . . . Sliding door device
2 . . . Sliding door
6*a* . . . Rail
7*a* . . . Support shaft
11 . . . Straight portion
12 . . . Inclined portion
15, 63*a* . . . Pull-in device
18, 62 . . . Trigger
19, 52 . . . Arm
20, 50, 51, 56 . . . Pull-in force transmission part
21*a* . . . Roller traveling body
53*a*, 53*b*, 53*c* . . . Link

What is claimed is:

1. A sliding door device, comprising:
a rail having a straight portion for linearly guiding a support shaft attached to a sliding door and an inclined portion which is inclined with respect to the straight portion and obliquely guides the support shaft;
a pull-in device having a base, a catcher slidable relative to the base, and a spring disposed between the base and the catcher, which can capture a trigger provided on the rail and which can only linearly move along the straight portion of the rail when the sliding door is closing; and
a pull-in force transmission part which is coupled to the pull-in device and moves the support shaft along the inclined portion according to linear movement of the pull-in device,
wherein the pull-in force transmission part includes:
a roller traveling body which can travel on at least the inclined portion of the rail, and
an arm rotatably coupled to the roller traveling body and the pull-in device,
wherein the support shaft is supported by the roller traveling body.

2. The sliding door device as claimed in claim 1, wherein the arm includes one or more links.

3. The sliding door device as claimed in claim 1, wherein the pull-in force transmission part includes a roller travelling body which can travel on the rail and which is rotatably coupled to the pull-in device, and
wherein the support shaft is supported by the roller traveling body.

4. A sliding door device, comprising:
a rail having a straight portion for linearly guiding a support shaft attached to a sliding door and an inclined portion which is inclined with respect to the straight portion and obliquely guides the support shaft;
a trigger which can be captured by a pull-in device having a base, a catcher slidable relative to the base, and a spring disposed between the base and the catcher and which can only linearly move along the straight portion of the rail when the sliding door is closing; and
a pull-in force transmission part which is coupled to the trigger and moves the support shaft along the inclined portion according to linear movement of the trigger,
wherein the pull-in force transmission part includes:
a roller traveling body which can travel on at least the inclined portion of the rail, and
an arm rotatably coupled to the roller traveling body and the pull-in device,
wherein the support shaft is supported by the roller traveling body.

5. The sliding door device as claimed in claim 4, wherein the arm includes one or more links.

* * * * *